US012573934B2

(12) United States Patent
Peng et al.

(10) Patent No.: US 12,573,934 B2
(45) Date of Patent: Mar. 10, 2026

(54) LINEAR CONTACTLESS ELECTRONIC SWITCH MODULE

(71) Applicant: Black & Decker Inc., New Britain, CT (US)

(72) Inventors: Mike Peng, Suzhou (CN); Paik Gu, Suzhou (CN); Marcell E. Coates, White Marsh, MD (US); Nathan Zhang, Suzhou (CN); Carl Zhang, Suzhou (CN)

(73) Assignee: BLACK & DECKER INC., New Britain, CT (US)

(*) Notice: Subject to any disclaimer, the term of this patent is extended or adjusted under 35 U.S.C. 154(b) by 212 days.

(21) Appl. No.: 18/435,172

(22) Filed: Feb. 7, 2024

(65) Prior Publication Data

US 2024/0275256 A1 Aug. 15, 2024

Related U.S. Application Data

(60) Provisional application No. 63/484,715, filed on Feb. 13, 2023.

(51) Int. Cl.
| | |
|---|---|
| *H02K 41/035* | (2006.01) |
| *H01H 9/34* | (2006.01) |
| *H02K 11/215* | (2016.01) |

(52) U.S. Cl.
CPC ......... *H02K 41/0356* (2013.01); *H01H 9/345* (2013.01); *H02K 11/215* (2016.01)

(58) Field of Classification Search
CPC .......................... H02K 41/0356; H02K 11/215
USPC ................................................. 310/13, 68 A
See application file for complete search history.

(56) References Cited

U.S. PATENT DOCUMENTS

| | | | |
|---|---|---|---|
| 2012/0292063 A1* | 11/2012 | Forster ..................... | H02P 6/14 |
| | | | 173/18 |
| 2020/0235638 A1 | 7/2020 | Velderman | |
| 2021/0151020 A1 | 5/2021 | Tanoue et al. | |

FOREIGN PATENT DOCUMENTS

| | | | | | |
|---|---|---|---|---|---|
| CN | 108899233 A | * | 11/2018 | ............... | H01H 9/06 |
| CN | 113348628 A | * | 9/2021 | ............ | H03K 17/97 |
| CN | 113992196 A | | 1/2022 | | |
| DE | 102006040647 A1 | * | 3/2008 | ............... | H01H 9/06 |
| DE | 102016014522 A1 | * | 6/2017 | ............ | H01H 13/08 |

(Continued)

OTHER PUBLICATIONS

Extending European Search Report mailed Jul. 4, 2024 in corresponding EP application No. 24156609.0, 8 pages.

*Primary Examiner* — Jose A Gonzalez Quinones
(74) *Attorney, Agent, or Firm* — Amir R. Rohani

(57) ABSTRACT

An aspect of the present disclosure is drawn to an electronic switch module including: a housing having a chute; a plunger member moveably mounted within the chute so as to be able to move along a first axis with a first velocity; a magnet member disposed within the housing; a Hall sensor disposed within the housing; and a displacement mechanism disposed within the housing and operable to displace the magnet member along a second axis with a second velocity by a distance away from the Hall sensor, wherein the first velocity is greater than the second velocity, and wherein the Hall sensor is operable to output a signal associated with a first location of the plunger member along the first axis based on a second location of the magnet member along the second axis.

20 Claims, 18 Drawing Sheets

(56)                    References Cited

FOREIGN PATENT DOCUMENTS

DE        102020120195  A1  *   2/2022   ............... B25F  5/00
GB                1225054  A      3/1971

* cited by examiner

1300

1302

1306

1304

1500

1502

1504

1506

1508

1500

1608   1606

1602

1604

1502

1504

1508

LINEAR CONTACTLESS ELECTRONIC SWITCH MODULE

RELATED APPLICATION

This utility patent application claims the benefit of U.S. Provisional Patent Application No. 63/484,715 filed Feb. 13, 2023, which is incorporated herein by reference in its entirety.

TECHNICAL FIELD

One or more embodiments relate generally to a linear electronic switch module of a power tool that is operable to detect a position of the switch.

BACKGROUND

Variable-speed trigger switches have been in use in power tools for a long time. Conventionally, a variable-speed trigger switch assembly includes a wiper in contact with a potentiometer. As a plunger member of the trigger is depressed, the wiper wipes across the potentiometer. The distance traveled by the wiper alters the detected resistance. The change in resistance is "mapped" to a location of the wiper, which corresponds to a current position of the plunger member. In these conventionally electronic switch modules, since the wiper and the potentiometer contact with each other, there will be mechanical wear and reduce the electronic switch module working life. This is especially true in tools working in high vibration and dust environment like jack hammers or impact drills. In such cases, the environment accelerates the wear and cause the failure of variable-speed trigger, even make the wiper broken and bring potential risk.

What is needed is an electronic switch module having a contactless position detection capability so as to increase the working life of the electronic switch module over that of the conventional electronic switch module discussed above.

SUMMARY

An aspect of the present disclosure is drawn to an electronic switch module including: a housing having a chute; a plunger member moveably mounted within the chute so as to be able to move along a first axis with a first velocity; a magnet member disposed within the housing; a Hall sensor disposed within the housing; and a displacement mechanism disposed within the housing and operable to displace the magnet member along a second axis with a second velocity, wherein the first velocity is greater than the second velocity, and wherein the Hall sensor is operable to output a signal associated with a first location of the plunger member along the first axis based on a second location of the magnet member along the second axis. In an embodiment, the Hall sensor is located at an offset distance from the second axis.

In some embodiments of this aspect, the first axis is parallel with the second axis. In some of these embodiments, the displacement mechanism includes a rack and a pinion, wherein the rack is disposed on the plunger member and is engaged with the pinion, and wherein the pinion is operable to rotate with an angular velocity when the plunger member moves along the first axis with the first velocity. In other of these embodiments, the displacement mechanism further includes a second rack and a second pinion, wherein the pinion has a first radius, wherein the second pinion has a second radius that is less than the first radius and is operable to rotate with the pinion at the angular velocity, wherein the second rack is engaged with the second pinion so as to move along the second axis with rotation of the second pinion, and wherein the magnet member is disposed on the second rack. In other of these embodiments, the electronic switch module further includes: a second magnet member disposed within the housing, wherein the displacement mechanism is additionally operable to displace the second magnet member along the second axis with the second velocity by a second distance away from the Hall sensor, and wherein the Hall sensor is operable to output the signal associated with the first location of the plunger member along the first axis based on both the second location of the magnet member along the second axis and a third location of the second magnet member along the second axis.

In some embodiments of this aspect, the first axis is angular, preferably perpendicular, with the second axis. In some of these embodiments, the plunger member includes a groove, and the displacement mechanism includes a slip operable to slide along the groove so as to displace the magnet member along the second axis with the second velocity by the distance away from the Hall sensor. In some of these embodiments, the displacement mechanism further includes a support member, wherein the support member is operable to house the magnet member, wherein the slip is connected to the support member, and wherein the support member is operable to enable the slip to move along the second axis based on the slip sliding along the groove. In some of these embodiments, the electronic switch module further includes: a second magnet member, wherein the support member is operable to additionally house the second magnet member, wherein the displacement mechanism is additionally operable to displace the second magnet member along the second axis with the second velocity by a second distance away from the Hall sensor, and wherein the Hall sensor is operable to output the signal associated with the first location of the plunger member along the first axis based on both the second location of the magnet member along the second axis and a third location of the second magnet member along the second axis.

In some embodiments of this aspect, an electronic switch module including: a housing having a chute; a plunger member moveably mounted within the chute so as to be able to move along a movement axis; a Hall sensor disposed within the housing; and two magnet members disposed within the housing and moveable by the movement of the plunger member, wherein the Hall sensor is operable to sense a first magnet member of the two magnet members within a first travel segment of the plunger member along the movement axis and a sense a second magnet member of the two magnet members within a second travel segment of the plunger member along the movement axis.

An aspect of the present disclosure is drawn to a power tool including: a main body; a rotor shaft; a motor operable to rotatably drive the rotor shaft; a handle portion; and a switch including: a housing having a chute; a plunger moveably mounted within the chute so as to be able to move along a first axis with a first velocity; a magnet disposed within the housing; a Hall sensor disposed within the housing; and a displacement mechanism disposed within the housing and operable to displace the magnet along a second axis with a second velocity by a distance away from the Hall sensor, wherein the main body supports the rotor shaft, the motor, and the handle portion, wherein the handle portion supports the switch, wherein the first velocity is greater than the second velocity, and wherein the Hall sensor is operable to output a signal associated with a first location of the plunger along the first axis based on a second location of the magnet along the second axis.

In some embodiments of this aspect, the first axis is parallel with the second axis. In some of these embodiments, the displacement mechanism includes a rack and a pinion, wherein the rack is disposed on the plunger member and is engaged with the pinion, and wherein the pinion is operable to rotate with an angular velocity when the plunger member moves along the first axis with the first velocity. In other of these embodiments, the displacement mechanism further includes a second rack and a second pinion, wherein the pinion has a first radius, wherein the second pinion has a second radius that is less than the first radius and is operable to rotate with the pinion at the angular velocity, wherein the second rack is engaged with the second pinion so as to move along the second axis with rotation of the second pinion, and wherein the magnet member is disposed on the second rack. In other of these embodiments, the method further includes: mounting a second magnet member onto the displacement mechanism, wherein the displacement mechanism is additionally operable to displace the second magnet member along the second axis with the second velocity by a second distance away from the Hall sensor, and wherein the Hall sensor is operable to output the signal associated with the first location of the plunger member along the first axis based on both the second location of the magnet member along the second axis and a third location of the second magnet member along the second axis.

In other embodiments of this aspect, the first axis is perpendicular with the second axis. In some of these embodiments, the plunger includes a groove, and the displacement mechanism includes a slip operable to slide along the groove so as to displace the magnet member along the second axis with the second velocity by the distance away from the Hall sensor. In some of these embodiments, the displacement mechanism further includes a support member, wherein the support member is operable to house the magnet member, wherein the slip is connected to the support member, and wherein the support member is operable to enable the slip to move along the second axis based on the slip sliding along the groove. In some of these embodiments, the switch further includes a second magnet, wherein the support member is operable to additionally house the second magnet, wherein the displacement mechanism is additionally operable to displace the second magnet along the second axis with the second velocity by a second distance away from the Hall sensor, and wherein the Hall sensor is operable to output the signal associated with the first location of the plunger along the first axis based on both the second location of the magnet along the second axis and a third location of the second magnet along the second axis.

In other embodiments of this aspect, the power tool further includes: a second magnet disposed within the housing, wherein the displacement mechanism is additionally operable to displace the second magnet along the second axis with the second velocity by a second distance away from the Hall sensor, and wherein the Hall sensor is operable to output the signal associated with the first location of the plunger along the first axis based on both the second location of the magnet along the second axis and a third location of the second magnet along the second axis.

DRAWINGS

The various advantages of the exemplary embodiments will become apparent to one skilled in the art by reading the following specification and appended claims, and by referencing the following drawings, in which:

DESCRIPTION

Figure 1:
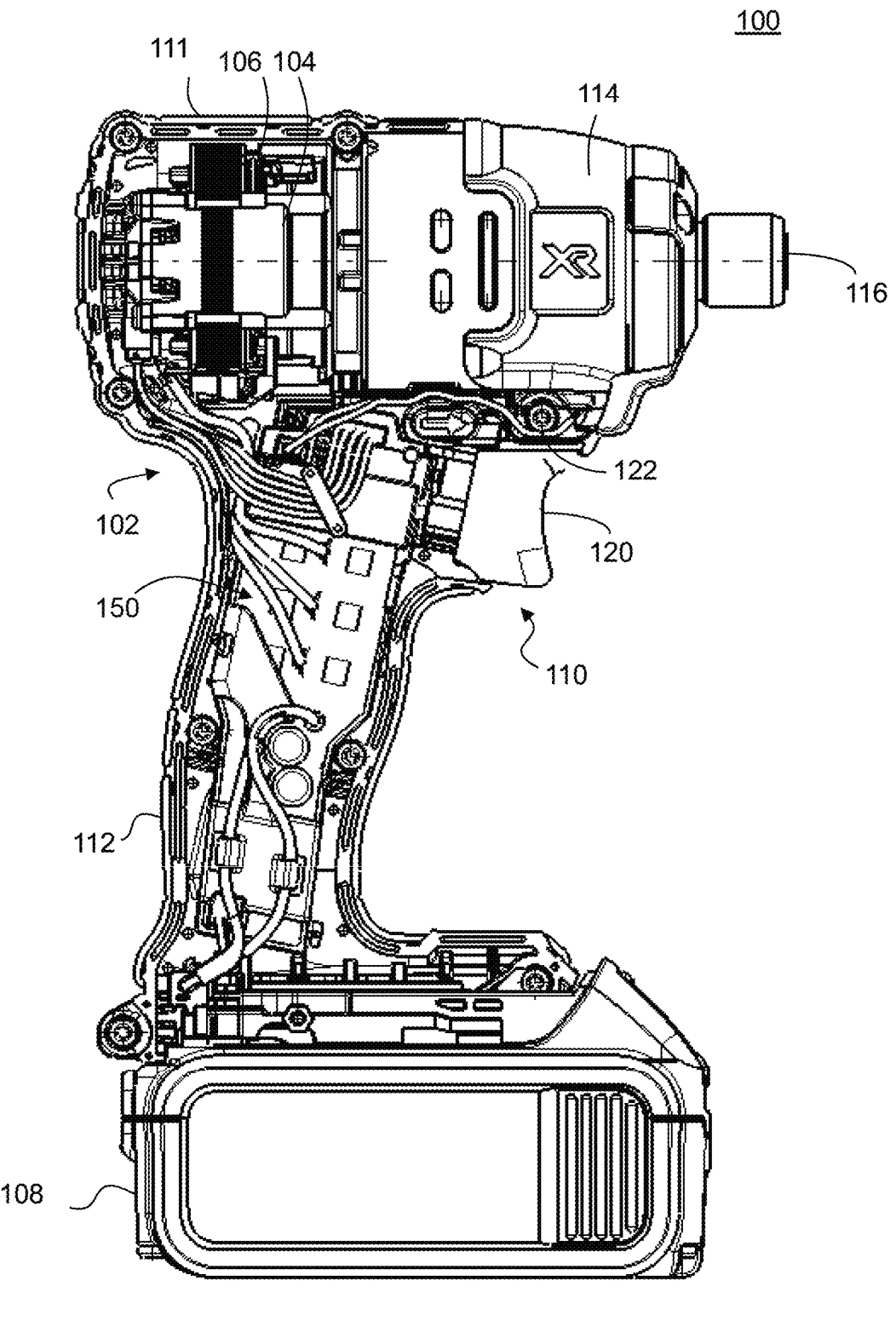
FIG. 1 illustrates an exemplary power tool.

With reference to the FIG. 1, a power tool 100 constructed in accordance with the teachings of the present disclosure is illustrated in a longitudinal cross-section view. Power tool 100 in the particular example provided may be a hand held impact driver, but it will be appreciated that the teachings of this disclosure is merely exemplary and the power tool of this invention could be any power tool. The power tool shown in FIG. 1 may include a housing 102, an electric motor 104, a battery pack 108, a transmission assembly (gear case) 114, and an output spindle 116. The gear case 114 may be removably coupled to the housing 102. The housing 102 can define a motor housing 111 and a handle 112.

According to an embodiment, motor 104 is received in motor housing 111. Motor 104 maybe be any type of motor and may be powered by an appropriate power source (electricity, pneumatic power, hydraulic power). In an embodiment, the motor is a brushless DC electric motor and is powered by a battery pack 108.

According to an embodiment of the invention, power tool 100 further includes an integrated electronic switch and control module 150 (hereinafter referred to as "electronic control module", or "control module"). Electronic control module 150, in an embodiment, may include a controller and electronic switching components for regulating the supply of power from the battery pack 108 to motor 105. In an embodiment, electronic control module 150 is disposed within the handle 112 below the motor housing 111, though it must be understood that depend on the power tool shape and specifications, electronic control module 150 may be disposed at any location within the power tool. Electronic control module may also integrally include components to support a user-actuated input unit 110 (hereinafter referred to as "input unit" 110) for receiving user functions, such as an on/off signal, variable-speed signal, and forward-reverse signal. In an embodiment, input unit 100 may be coupled to a variable-speed trigger 120, although other input mechanism such as a touch-sensor, a capacitive-sensor, a speed dial, etc. may also be utilized. In an embodiment, an on/off signal is generated upon initial actuation of the variable-speed trigger 120. In an embodiment, a forward/reverse button 122 is additionally provided on the tool 100. The forward/reverse button 122 may be pressed on either side of the tool in a forward, locked, or reverse position. In an embodiment, the associated circuitry and components of the input unit 110 that support the variable-speed trigger 120 and the forward/reverse button 122 may be fully or at least partially integrated into the electronic control module 150. Based on the input signals from the input unit 110 and associated components, the controller and electronic switching components of the electronic control module 150 modulate and regulate the supply of power from the battery pack 108 to motor 105. Details of the electronic control module 150 are discussed later in detail.

While in this embodiment, the power source is battery pack 108, it is envisioned that the teachings of this disclosures may be applied to a power tool with an AC power source. Such a power tool may include, for example, a rectifier circuit coupled to the AC power source.

It must be understood that, while FIG. 1 illustrates a power tool impact driver having a brushless motor, the teachings of this disclosure may be used in any power tool, including, but not limited to, drills, saws, nailers, fasteners, impact wrenches, grinders, sanders, cutters, etc. Also, teachings of this disclosure may be used in any other type of tool or product that include a rotary electric motor, including, but not limited to, mowers, string trimmers, vacuums, blowers, sweepers, edgers, etc.

In an embodiment, the input unit 110 of the electronic switch module 150 in accordance with aspects of the present disclosure includes a variable-speed switch assembly coupled to the variable-speed trigger 120 and configured to detect a travel distance of the trigger 120, i.e., the "trigger pull", and output a variable-voltage signal accordingly. The variable-voltage signal is coupled to the controller, which controls a control speed of the motor accordingly. Examples of a variable-speed switch assembly are described in detail in U.S. Pat. Nos. 9,508,498 and 10,497,524, which are incorporated herein by reference in their entireties. In an embodiment described in this disclosure, the variable-speed trigger switch includes a contactless position detection capability so as to increase the operational life of the electronic switch module over that of conventional switch configurations.

In accordance with aspects of the present disclosure, a variable-speed switch includes a plunger member having a magnet member attached thereto coupled to variable-speed trigger 120. When the plunger member is depressed, it caused the magnet to move in the direction of a stationary Hall sensor. The stationary Hall sensor is positioned to detect the magnetic field from the magnet member on the plunger member. The amount of the detected magnetic field from the magnet member will vary based on the position of the magnet member along the axis of movement of the magnet member relative to the Hall sensor. Accordingly, the Hall sensor is able to detect the position of the plunger member along the axis of movement of the plunger member via proxy of the position of the magnet member.

The strength of the magnetic field from the magnet member drops precipitously as the distance between the magnet member and the Hall sensor along the axis of movement of the plunger member increases. In particular, for a plunger member that might move a total distance of 8.0 mm or greater, such a total distance may be far too long to be effectively detected by a Hall sensor, unless a very strong and very expensive magnet member is used. Specifically, as discussed in detail below, the Hall sensor may have a magnetic detection range that is smaller than the travel distance of the plunger member. To address this issue, in accordance with aspects of the present disclosure, the magnet member is not affixed directly to the plunger member. On the contrary, in accordance with aspects of the present disclosure, a displacement mechanism is used to displace the magnet member at a distance that is shorter than the distance moved by the plunger member, but is compatible with the magnetic detection range of the Hall sensor. In this manner, the position of the plunger member may be determined throughout the total span of motion of the plunger member, while only moving the magnet member a fraction of the distance.

In some embodiments, the displacement mechanism includes a rack and pinion system. As will be described in greater detail below, the rack and pinion system is operable to move the magnet member in a direction parallel with the direction of movement of the plunger member. However, the amount of movement of the magnet member is only a fraction of that of the plunger member.

In other embodiments, the displacement mechanism includes a slip and groove system. As will be described in greater detail below, the slip and groove system are operable to move the magnet member in a direction different from the direction of movement of the plunger member, e.g., in a direction approximately perpendicular to the direction of movement of the plunger member. Further, the amount of movement of the magnet member is only a fraction of that of the plunger member.

In either of the above briefly-discussed embodiments, in accordance with aspects of the present disclosure, the "magnet member" may include a two magnet members separated by a distance, wherein each magnet member is disposed so as to provide oppositely polarized magnetic fields to the Hall sensor. With such an arrangement, the Hall sensor is able to receive a much stronger signal to more accurately detect the position of the plunger member.

These aspects will be described in greater detail below, starting with a brief discussion of the effectiveness of a Hall sensor.

A magnet member can induce the linear Hall sensor to output a linear voltage based on the magnetic induction intensity. There is no contact in this process, and the magnetic field has a good reliability in dust, salt mist and humidity conditions.

The output voltage of a Hall sensor and the magnetic induction are following:

$$V_{out} = Sens \times B \qquad (1)$$

Here, Vout is the output voltage, Sens is a constant that means the sensitivity of the Hall sensor, and B is the magnetic induction, which varies with distance. This will be described in greater detail with reference to FIG. 2.

Figure 2:
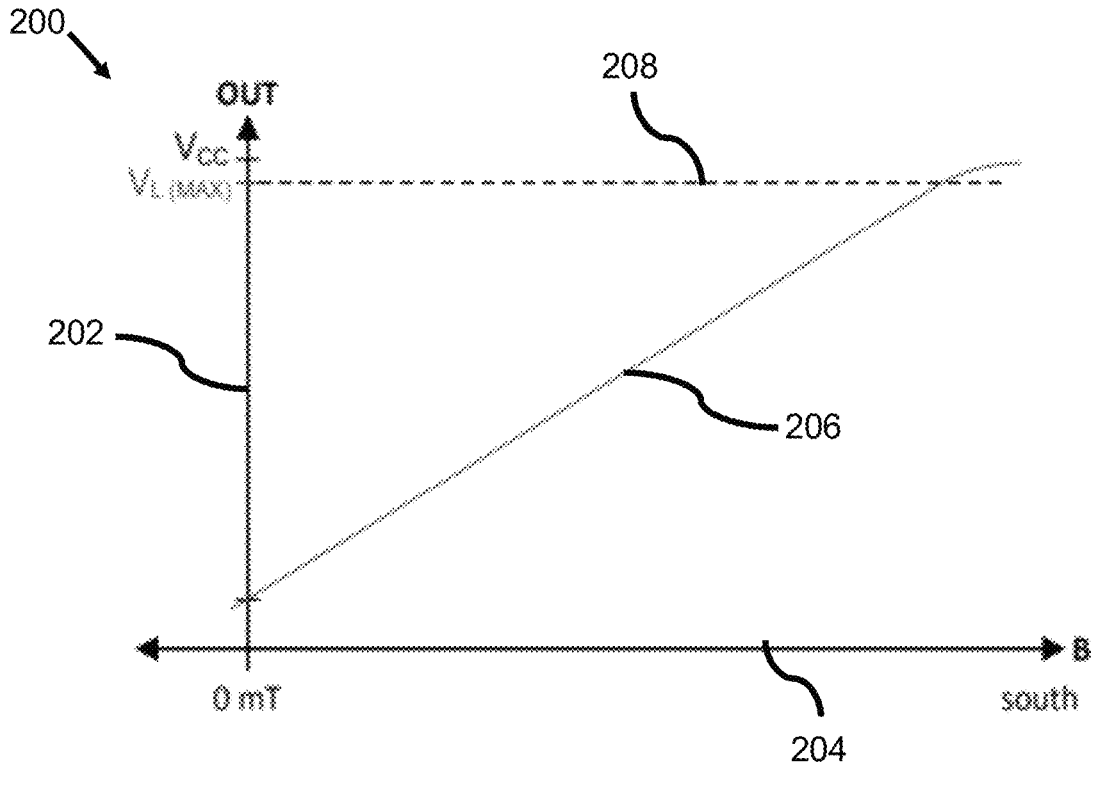
FIG. 2 illustrates a graph of a magnetic response of a Hall sensor.

FIG. 2 illustrates a graph 200 of a magnetic response of an example Hall sensor to a moving magnet. As illustrated in the figure, graph 200 includes a y-axis 202, an x-axis 204, a curve 206, and a dashed line 208. Y-axis 202 represents the output voltage from the Hall sensor and is in units of volts. X-axis 204 represents the magnitude of a magnetic flux density of the magnet detected by the Hall sensor, in this example with a southern polarization, and is in units of milliteslas. Curve 206 represents the output voltage from the example Hall sensor as a function of the magnitude of the magnetic field incident thereon.

As illustrated in the figure, the output voltage of a Hall sensor rises linearly as a function of the magnetic flux density of the magnet as detected by the Hall sensor, from a low voltage point at 0 milliteslas to the maximum voltage output indicated by dashed line 208. In particular, the output voltage of the Hall sensor and the detected magnetic flux density are generally linearly dependent.

Figure 3A:
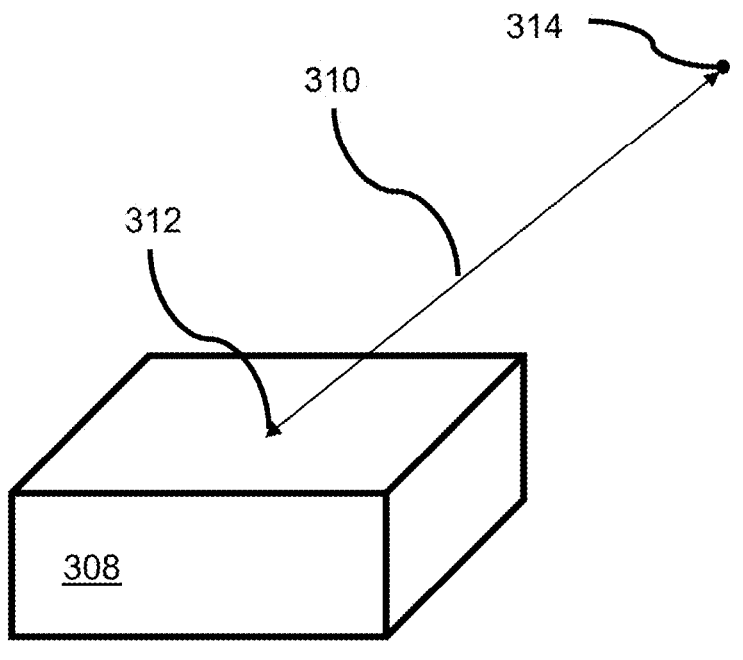
FIG. 3A is a simple illustration depicting a travel axis of a center of a magnet.
Figure 3B:
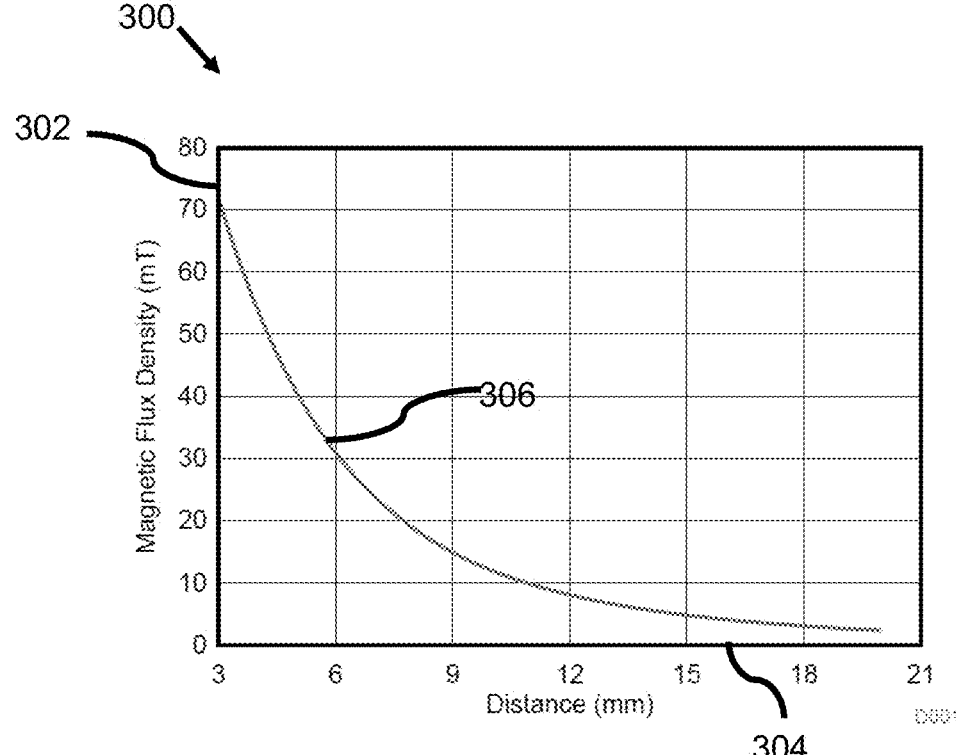
FIG. 3B illustrates a graph of magnetic flux density as a function of distance.

FIG. 3A is a simple illustration depicting a travel axis of a center of a magnet 308 as it travels a distance 310 from a first point 312 to a second point 314. FIG. 3B illustrates a graph 300 of a magnetic flux density of the magnet 308 as detected by a Hall sensor (not shown) located proximate the second point 314 as a function of distance of the magnet 308 to the Hall sensor. As illustrated in the figure, graph 300 includes a y-axis 302, an x-axis 304, and a curve 306. Y-axis 302 represents the magnetic flux density of a magnetic field of the magnet 308 detected by the Hall sensor and is in units of milliteslas. X-axis 304 represents a distance between the magnet 308 and the Hall sensor and is in units of millimeters.

Curve 306 shows the character of the change of magnetic flux density as a function of distance. As shown, the Hall sensor exhibits high sensitivity to the magnetic flux density of the magnet when the magnet is at relatively close proximity to the Hall sensor. However, as the magnet moves further away from the Hall sensor, the ability of the Hall sensor to accurately detect the magnetic flux decreases drastically. Consequently, the voltage output of the Hall sensor becomes less responsive to the movement of the magnet as the magnet moves further away from the Hall sensor.

As shown in this exemplary graph, the Hall sensor optimally detects the relative position of the magnet when the magnet is within the distance of approximately 0.6 mm to 2.2 mm of the Hall sensor. Outside this range, the detected magnetic field, and consequently the output voltage, flatten as a function of distance, and the Hall sensor cannot be used to reliably and accurately detect the relative position of the magnet. Accordingly, in this example, for optimal detection of the relative position of the magnet using the Hall sensor, the range of movement of the magnet (i.e., as measured from the center of the magnet to the hall sensor) should desirably be within in the range of 0.6 mm to 2.2 mm.

Figure 4:
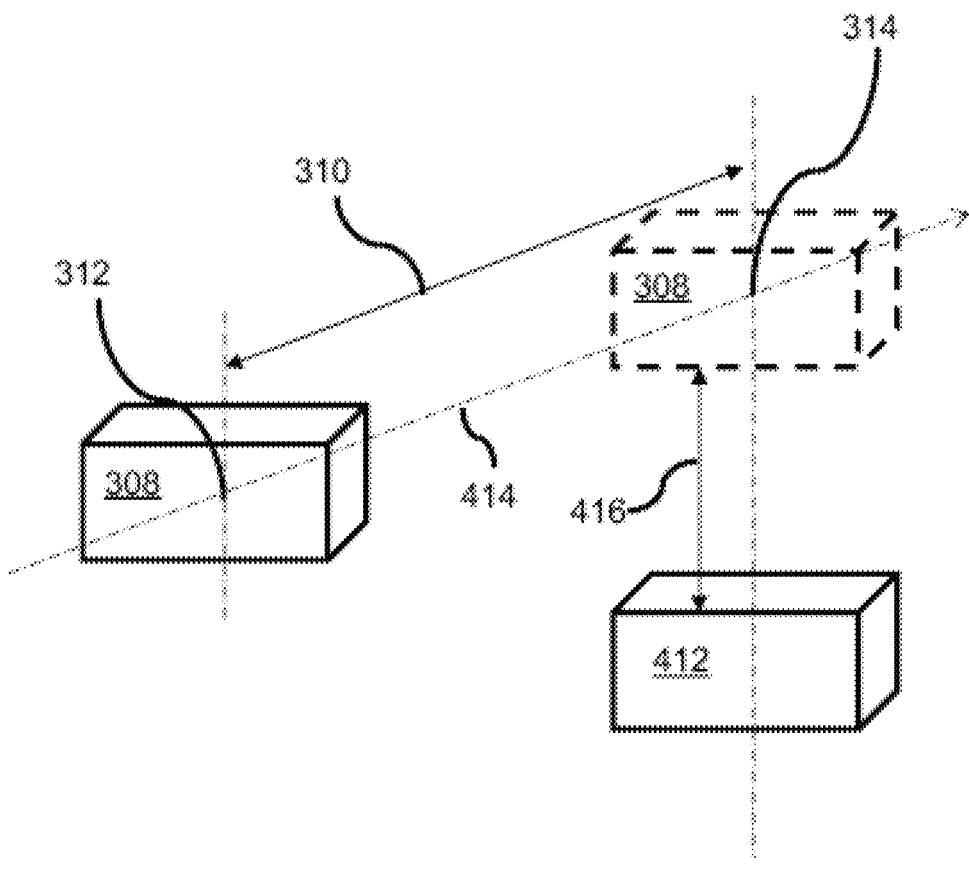
FIG. 4 depicts a simple illustration of the magnet movement along with the Hall sensor at an offset gap.

FIG. 4 depicts a simple illustration of the magnet 308 as it travels the distance 310 from the first point 312 to the second point 314 along a movement axis 414, further depicting a Hall sensor 412 that is offset by an offset gap 416 from the magnet 308. As further illustrated below, this offset gap 412 may be optimized to obtain a desired voltage output curve from the Hall sensor in response to the movement of the magnet.

Figure 5:
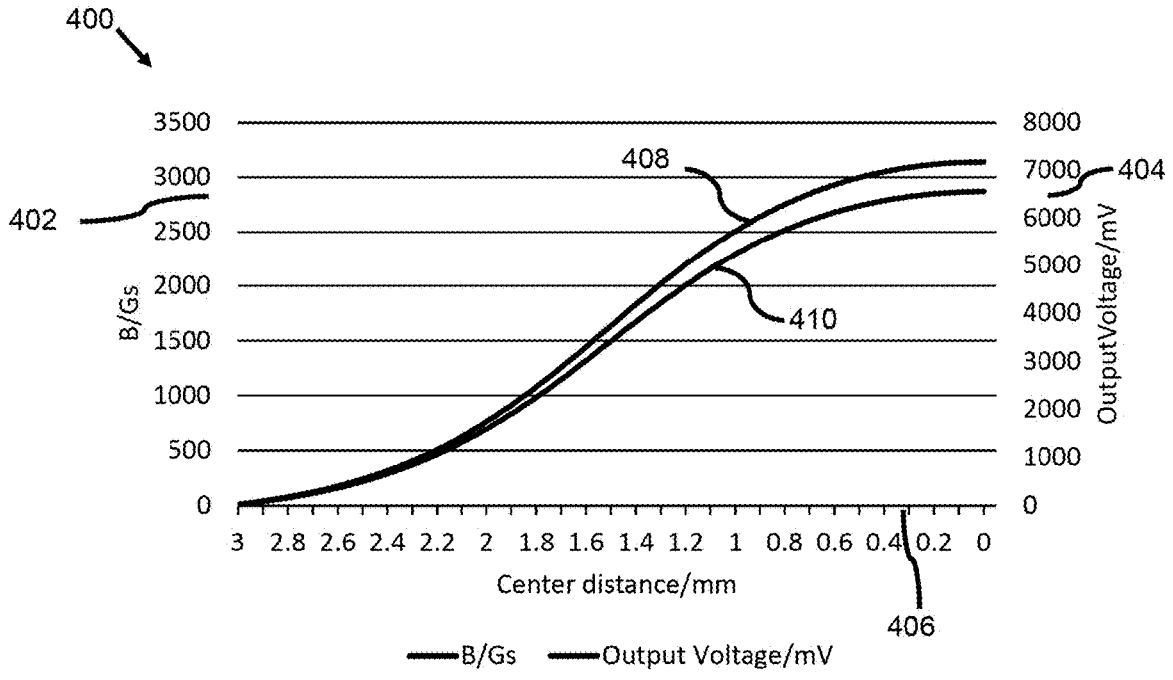
FIG. 5 illustrates a graph showing the relationship of the magnetic field of the magnet and the corresponding output voltage of the Hall sensor, as a function of the travel distance of the magnet, where the Hall sensor is at an offset gap of 3 mm from the magnet.

FIG. 5 illustrates a graph 400 showing the relationship of the magnetic field of the magnet as detected by the Hall sensor, and the corresponding output voltage of the Hall sensor, as a function of the travel distance of the magnet, where the Hall sensor is at an offset gap of 3 mm from the magnet, according to an exemplary embodiment. As illustrated in the figure, graph 400 includes a y-axis 402, a y-axis 404, an x-axis 406, a curve 408, and a curve 410. Y-axis 402 represents the magnitude of the magnetic field in Gauss. Y-axis 404 represents the output voltage from a Hall sensor in units of millivolts. X-axis 406 represents the travel distance of the magnet in units of millimeters. Curves 408 and 410 respectively show the detected magnetic field and the output voltage of the Hall sensor relative to the distance.

Figure 6:
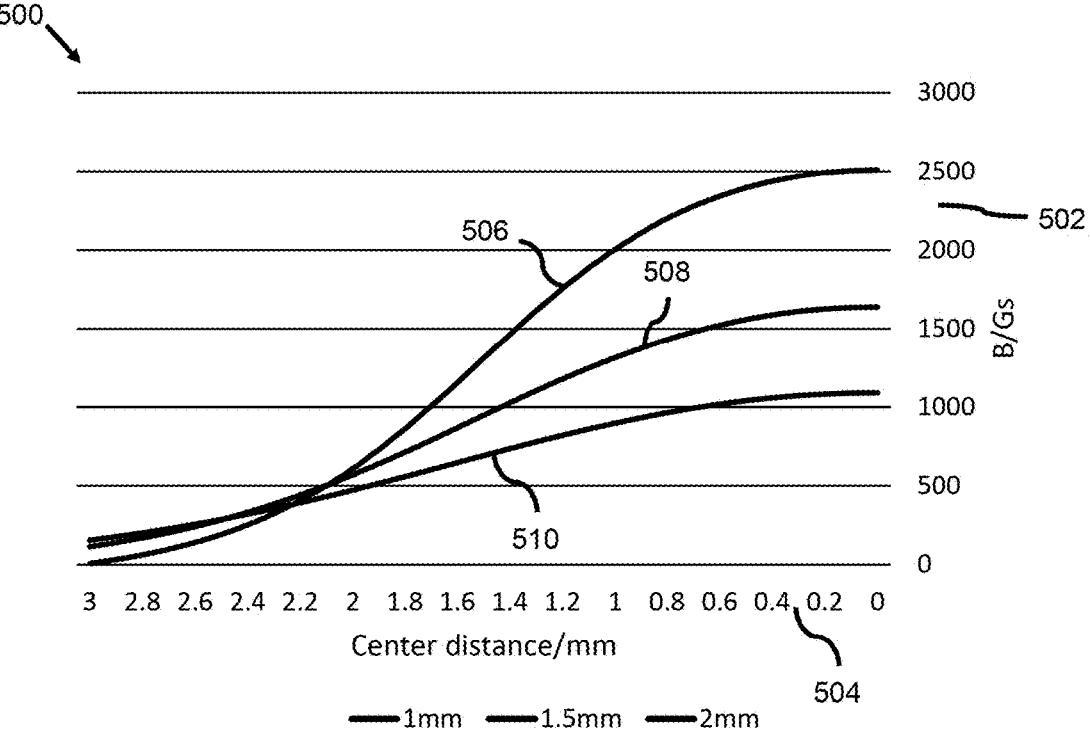
FIG. 6 illustrates a graph showing the detected magnetic field of the magnet as a function of the travel distance of the magnet under various offset gaps.

FIG. 6 illustrates a graph 500 showing the detected magnetic field of the magnet as a function of the travel distance of the magnet under various Hall sensor offset gaps, according to an embodiment. As illustrated in the figure, graph 500 includes a y-axis 502, an x-axis 504, a curve 506, a curve 508, and a curve 510. Y-axis 502 represents the magnetic field of the magnet detected by a Hall sensor and is in units of Gauss. X-axis 504 represents the travel distance of the magnet and is in units of millimeters. Curves 506, 508 and 510 correspond to the detected magnetic field as functions of travel distance of the magnet for a Hall sensor offset gap of 1 mm, 1.5 mm, and 2 mm respectively.

As shown in FIGS. 5 and 6, by providing the Hall sensor at an offset distance from the travel axis of the magnet, the magnetic field curve of the magnet, and thus the corresponding output voltage curve, may be optimized as desired. There is a linear output part in each of curves 506, 508, and 510. Linearity, δ, is a measure that tests whether the output and the input of a system maintain a normal linear relationship as in an ideal system. With this in mind, the lower the linearity the better the system. In this case, the input is change of horizontal distance and the output is magnetic induction. The equation of linearity, δ, is as follows:

$$\delta = (\Delta Y_{max})/Y \times 100\% \qquad (2)$$

According to equation (2), the linearity will not change after multiplying the curve by constants. Therefore, the linearities of magnetic induction and voltage are the same. A 5% linearity is typically used in industry as an acceptable standard for as long a travel distance as possible.

It was found by the inventors that for the Hall sensor tested with offset gap of 1 mm as indicated by curve 506 and with a travel distance from 0.7-2.3 mm, the resulting actual linearity was 4.957%. For the Hall sensor tested with an offset gap of 1.5 mm as indicated by curve 508 and with a travel distance from 0.6-2.5 mm, the resulting actual linearity was 4.321%. For the Hall sensor tested with an offset gap of 2 mm as indicated by curve 510 and with a travel distance from 0.5-2.9 mm, the resulting actual linearity was 4.412%. Accordingly, according to one aspect of this disclosure, providing an optimum offset gap between the Hall sensor and the travel axis of the magnet is important in obtaining a desired voltage output curve from the Hall sensor that correlates to the position of the magnet.

Although adjusting the offset gap is helpful for extending the acceptable travel, it is also desirable to provide a solution to translate the travel distance of the trigger switch, which may be approximately 5 mm or more in some power tool applications, to a magnet travel distance that is within the optimal detection range of the Hall sensor. Therefore, in accordance with aspects of this disclosure, a displacement mechanism is provided for controlling the movement of the magnet, as described herein in detail.

Figure 7:
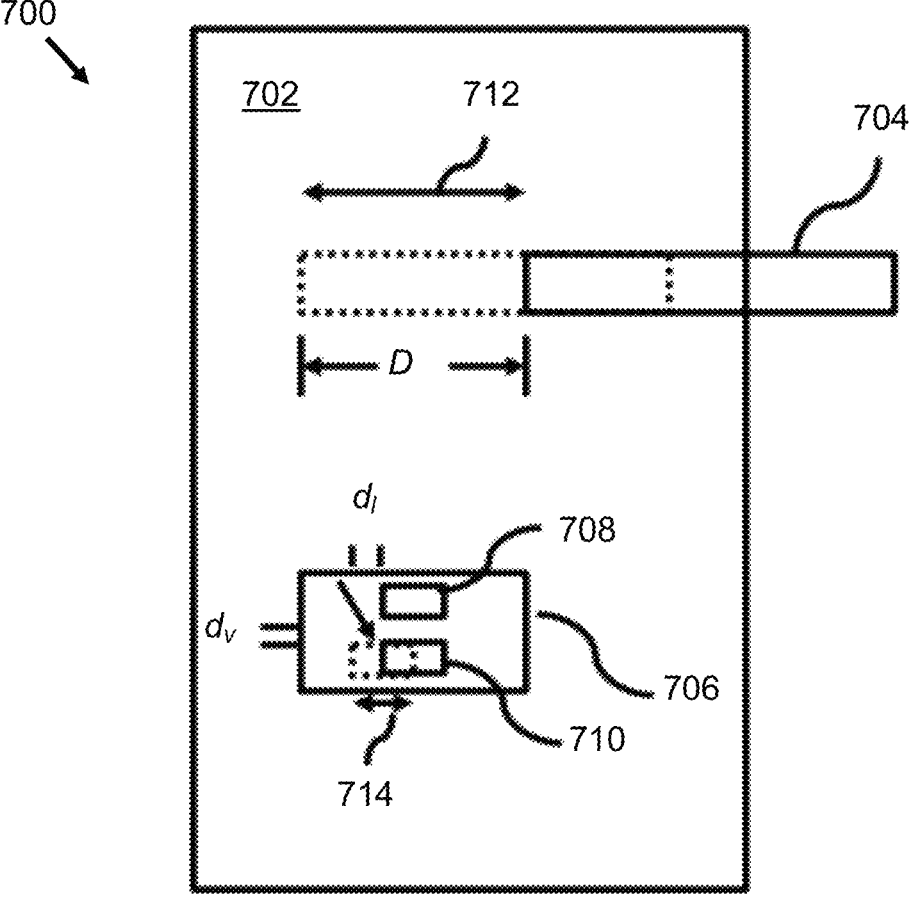
FIG. 7 illustrates a linear contactless electronic switch module using a magnet member and Hall sensor in accordance with aspects of the present disclosure.

FIG. 7 illustrates an exemplary linear contactless electronic switch module 700 using a magnet member and Hall sensor in accordance with aspects of the present disclosure. As illustrated in the figure, linear contactless electronic switch module 700 includes a housing 702, a plunger member 704, a displacement mechanism 706, a Hall sensor 708 and a magnet member 710. Housing 702 houses plunger member 704, which is coupled to a trigger switch (not shown) actuatable by a user outside the housing 702, displacement mechanism 706, Hall sensor 708, and magnet member 710.

Plunger 704 is moveably mounted within a chute in housing 702 so as to be able to move along an axis 712 by a distance, D. Displacement mechanism 706 is operable to displace magnet member 710 along an axis 714 relative to Hall sensor 708. Further, displacement mechanism 706 is operable to displace magnet member 710 along an axis 714 by a lateral distance, di, that is less than the distance D of which plunger member 704 can move along axis 712. Further, magnet member 710 is disposed at an offset distance, $d_y$, from Hall sensor 708.

As mentioned above, two non-limiting example embodiments are described herein for displacement mechanism 706. In one non-limiting example embodiment, displacement mechanism 706 is operable to move magnet member 710 along axis 714, wherein axis 714 is parallel with axis 712 of plunger member 704. In another non-limiting example embodiment, displacement mechanism 706 is operable to move magnet member 710 along with a movement axis that is angular, i.e., preferably perpendicular, to axis 712 of plunger member 704.

The first embodiment, wherein displacement mechanism 706 is operable to move magnet member 710 along axis 714, wherein axis 714 is parallel with axis 712 of plunger member 704, will now be described in greater detail with reference to FIGS. 8A through 9B.

Figure 8A:
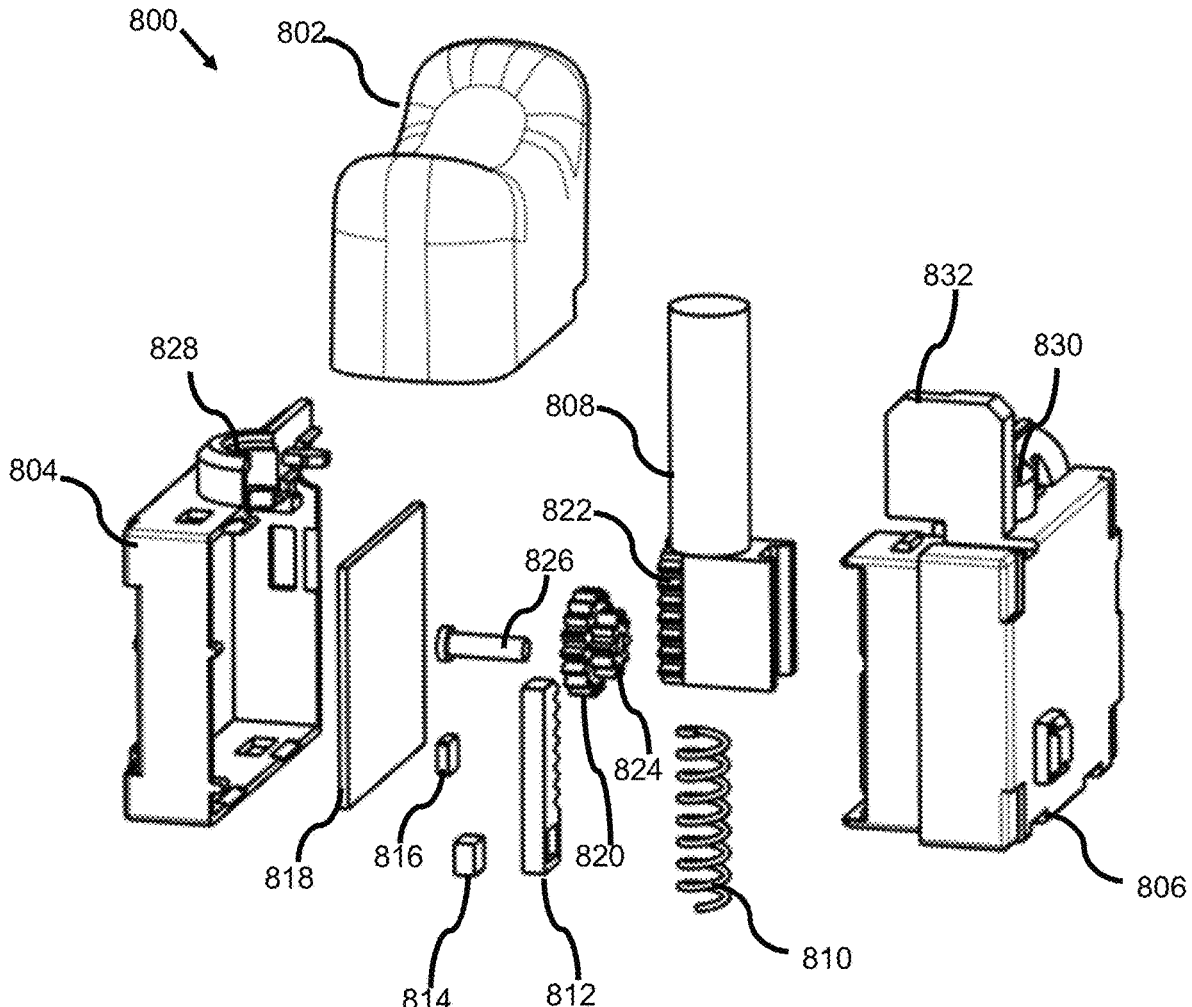
FIG. 8A illustrates an oblique, right-handed, exploded view of an example linear contactless electronic switch module using a magnet member and Hall sensor in accordance with aspects of the present disclosure.

FIG. 8A illustrates an oblique, right-handed, exploded view of an example linear contactless electronic switch module 800 using a magnet member 814 and Hall sensor 816 in accordance with aspects of the present disclosure.

As illustrated in FIG. 8A, linear contactless electronic switch module 800 includes a trigger 802, a housing body part 804, a housing body part 806, a plunger member 808, a restoring force spring 810, a rack 812, a magnet member 814, a Hall sensor 816, a printed circuit board (PCB) 818, a pinion 820, a rack 822, a pinion 824, and an axle 826. Housing body part 804 includes a cut out 828, whereas housing body part 806 includes a cut out 830. Further, housing body part 806 includes a trigger stop 832.

Figure 8B:
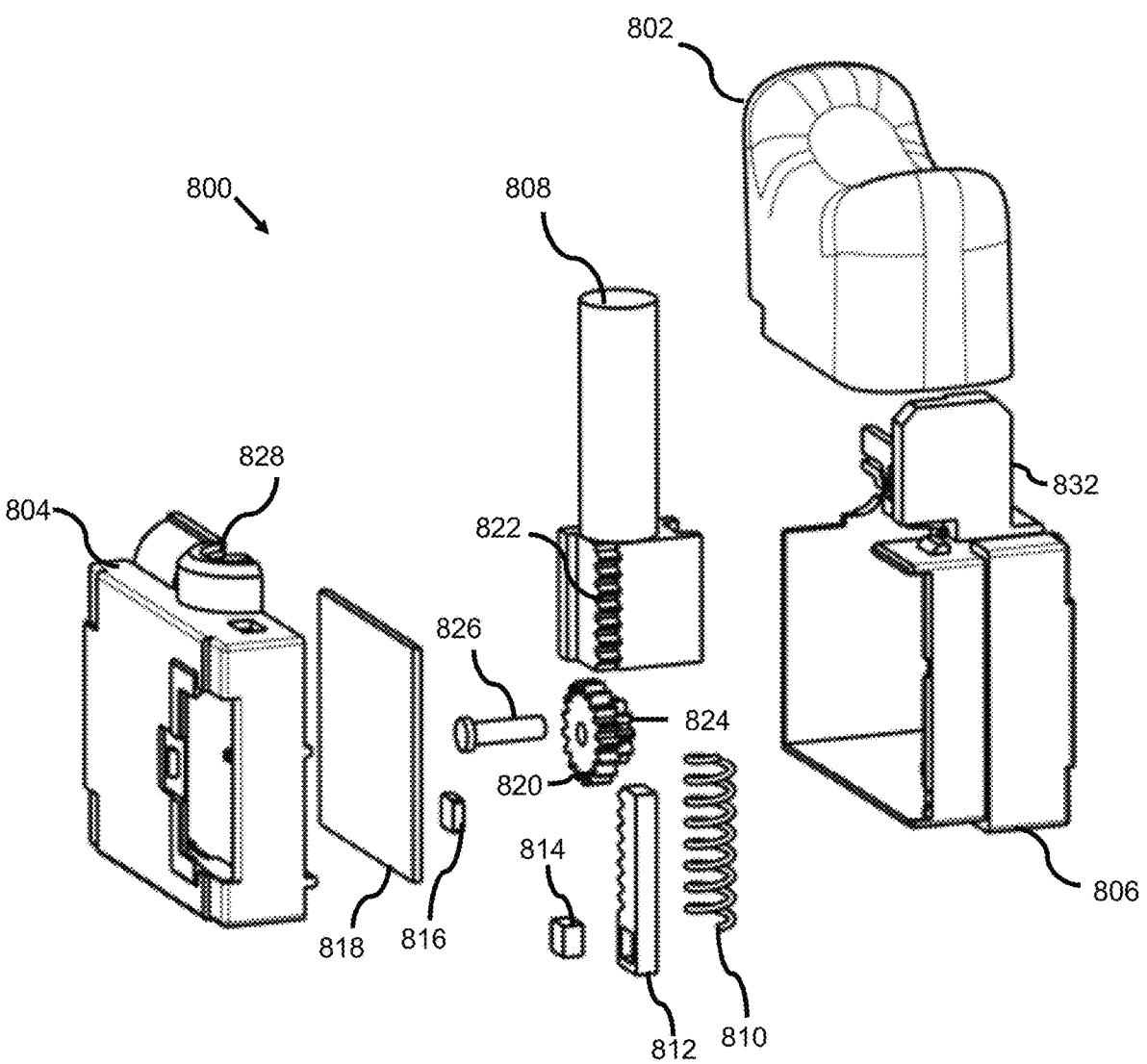
FIG. 8B illustrates an oblique, left-handed, exploded view of the example linear contactless electronic switch module of FIG. 8A.

FIG. 8B illustrates an oblique, left-handed, exploded view of linear contactless electronic switch module 800 of FIG. 8A. Housing body part 804 is operable to snap together with housing body part 806 so as to house the remaining elements. The interaction of the elements of linear contactless electronic switch module 800 will be described in greater detail with reference to FIGS. 9A and 9B.

Figure 9A:
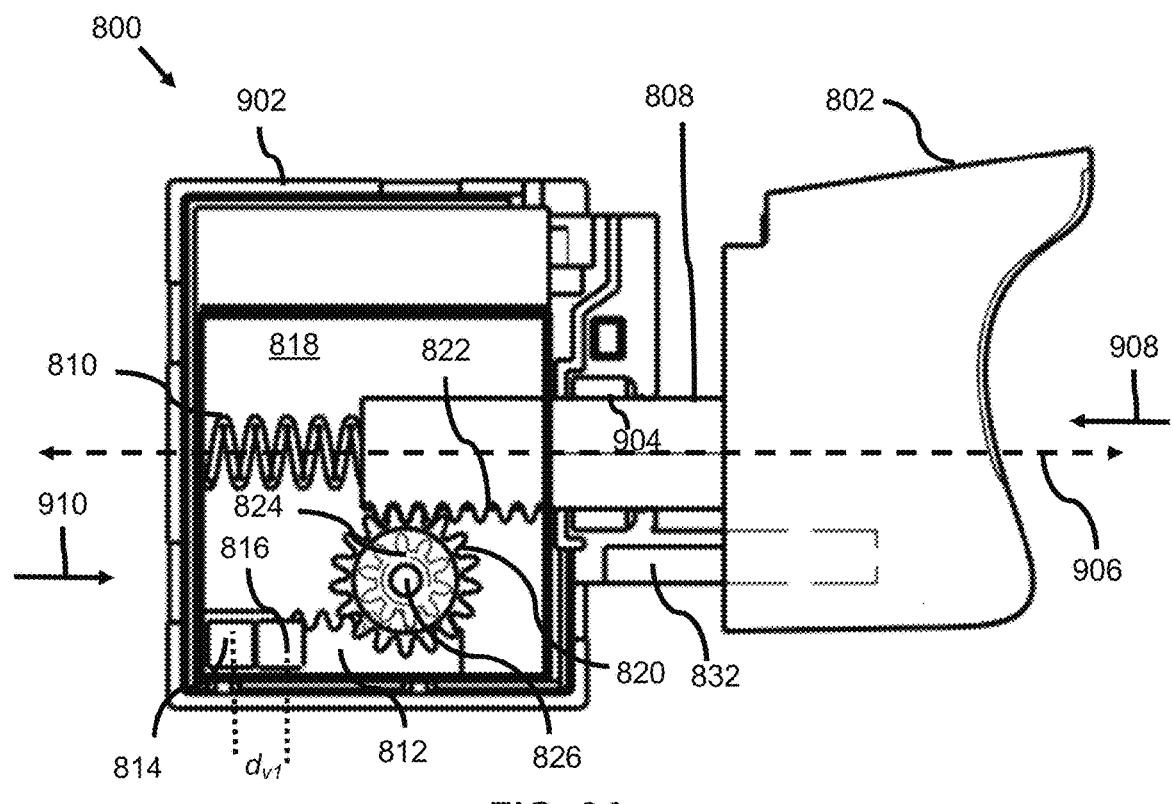
FIG. 9A illustrates a transparent plan view of the example linear contactless electronic switch module of FIG. 8A at an initial state.

FIG. 9A illustrates a transparent plan view of the example linear contactless electronic switch module 800 at an initial state.

Figure 9B:
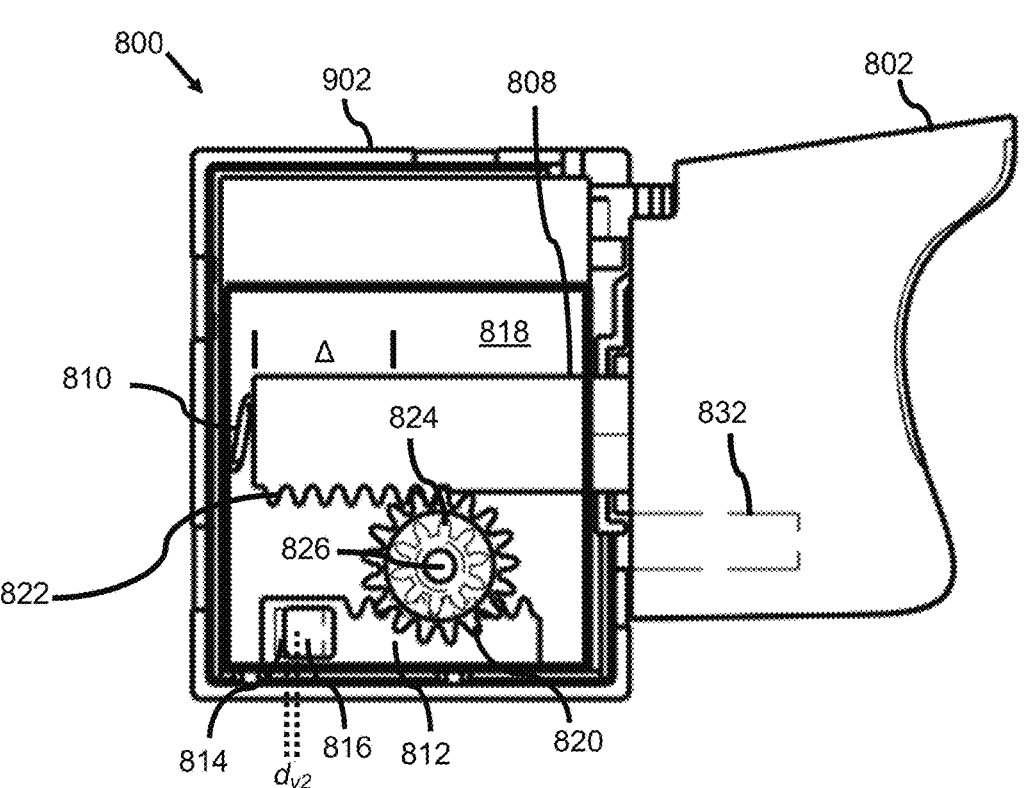
FIG. 9B illustrates a transparent plan view of the example linear contactless electronic switch module of FIG. 8A at a fully depressed state.

FIG. 9B illustrates a transparent plan view of the example linear contactless electronic switch module 800 at a fully depressed state.

As illustrated in these figures, trigger 802 is connected to plunger member 808. Housing body part 804 and housing body part 806 are connected to form a housing 902. Further, when connected together to form housing 902, cut out 828 of housing body part 804 and cut out 830 of housing body part 806 form a chute 904 for which plunger member 808 may move along an axis 906.

Plunger 808 is additionally connected to rack 822. Restoring force spring 810 is disposed between the bottom of plunger member 808 and housing 902. Pinion 820 and pinion 824 are concentrically located about axle 826 to assure that they have the same angular velocity. In some embodiments, pinion 820 and pinion 824 are combined as a unitary compound pinion to assure that they will have the same angular velocity. Rack 822 is operable to engage with pinion 820, whereas rack 812 is operable to engage with pinion 824. Rack 822 is disposed on plunger member 808. Rack 812 is slidably affixed on the inner surface of housing 902. Magnet 814 is disposed on rack 812. Hall sensor 816 is disposed on PCB 818.

In operation, when trigger 802 is pressed in a direction 908, plunger member 808 moves in direction 908 along axis 906 through chute 904. The teeth of rack 822, which is connected to plunger member 808, are engaged with the teeth of pinion 820. Accordingly, as plunger member moves in direction 908, the teeth of rack 822 rotate pinion 820 in a counter-clockwise direction. Because pinion 820 and pinion 824 are concentrically located about axle 826, when pinion 820 rotates in the counter-clockwise direction, so does pinion 824. Further, pinion 820 and pinion 824 have the same angular velocity, $\omega$.

The teeth of pinion 824 engage with the teeth of rack 812 such that as pinion 824 rotates in the counter-clockwise direction, rack 812 moves in a direction 910. When rack 812 moves in direction 910, magnet member 814 moves laterally closer to Hall sensor 816.

More specifically, rack 822 drives the pinion 820 with the following linear velocity $v_{620}$:

$$v_{620} = \omega \cdot r_{620} \tag{3}$$

wherein $r_{620}$ is the radius of pinion 820. and wherein the angular velocity ω of pinion 820 is:

$$\omega = v_{620}/r_{620} \qquad (4)$$

Pinion 824 drives rack 812 with a linear velocity of:

$$v_{612} = r_{624}/r_{620} \cdot v_{620}(r_{620} > r_{624}) \qquad (6)$$

wherein $r_{624}$ is the radius of pinion 824.

For a working example, let plunger member 808 be able to fully travel in direction 908 for 8 mm. Further, let the radius of pinion 820, $r_{620}$, be 5.7 mm, and let the radius of pinion 824, $r_{624}$, be 2.5 mm. Further, let plunger member 808 have a 5.7 mm variable-speed travel. In accordance with aspects of the present disclosure, as a result of arrangement of rack 822, pinion 820, pinion 824 and rack 812, with a 2.5 mm displacement of magnet member 814, the ratio of the radii of pinion 820 and pinion 824 is $i=r_{620}/r_{624}=5.7/2.5=2.28$.

In a working example: the module of pinion 824, m, is 0.5, the number of teeth of pinion 824, $z_{624}$, is 10, the pitch diameter of pinion 824, $d_{624}$, is 5 mm, the teeth of pinion 820, $z_{620}$, is 23, and the pitch diameter of pinion 820, $d_{620}$, is 11.5 mm.

In this example, the vertical distance between magnet member 814 and Hall sensor 816 be 2 mm. During the movement, let there be an initial lateral distance, $d_{v1}$, between magnet member 814 and Hall sensor 816. Initially, as illustrated in FIG. 9A, let the horizontal distance between the middle of magnet member 814 and the middle of Hall sensor 816 be 4 mm. After the 2.3 mm empty travel, wherein only rack 822 moves along direction 908, the lateral distance between the middle of magnet member and hall became 3 mm.

At last, as illustrated in FIG. 9B, plunger member 808 finishes the 8 mm full travel. Trigger stop 832 engages trigger 802 to limit the distance traveled in direction 908 so as to prevent over-compression and damage to restoring force spring 810.

As illustrated in FIG. 9B, the horizontal distance, $d_{v2}$, between the middle of magnet member 814 and Hall sensor 816 is 0.5 mm. Therefore, a difference in the travel of magnet member 814 is 4 mm-0.5 mm, or 3.5 mm, whereas plunger member 808 traveled a distance, Δ, of 8 mm. Accordingly, magnet member 814 traveled only a fraction of the distance as compared to that of plunger member 808.

The second embodiment, wherein displacement mechanism 706 is operable to move magnet member 710 along an axis that is angular, e.g., preferably perpendicular, with axis 712 of plunger member 704, will now be described in greater detail with reference to FIGS. 10A through 11B.

Figure 10A:
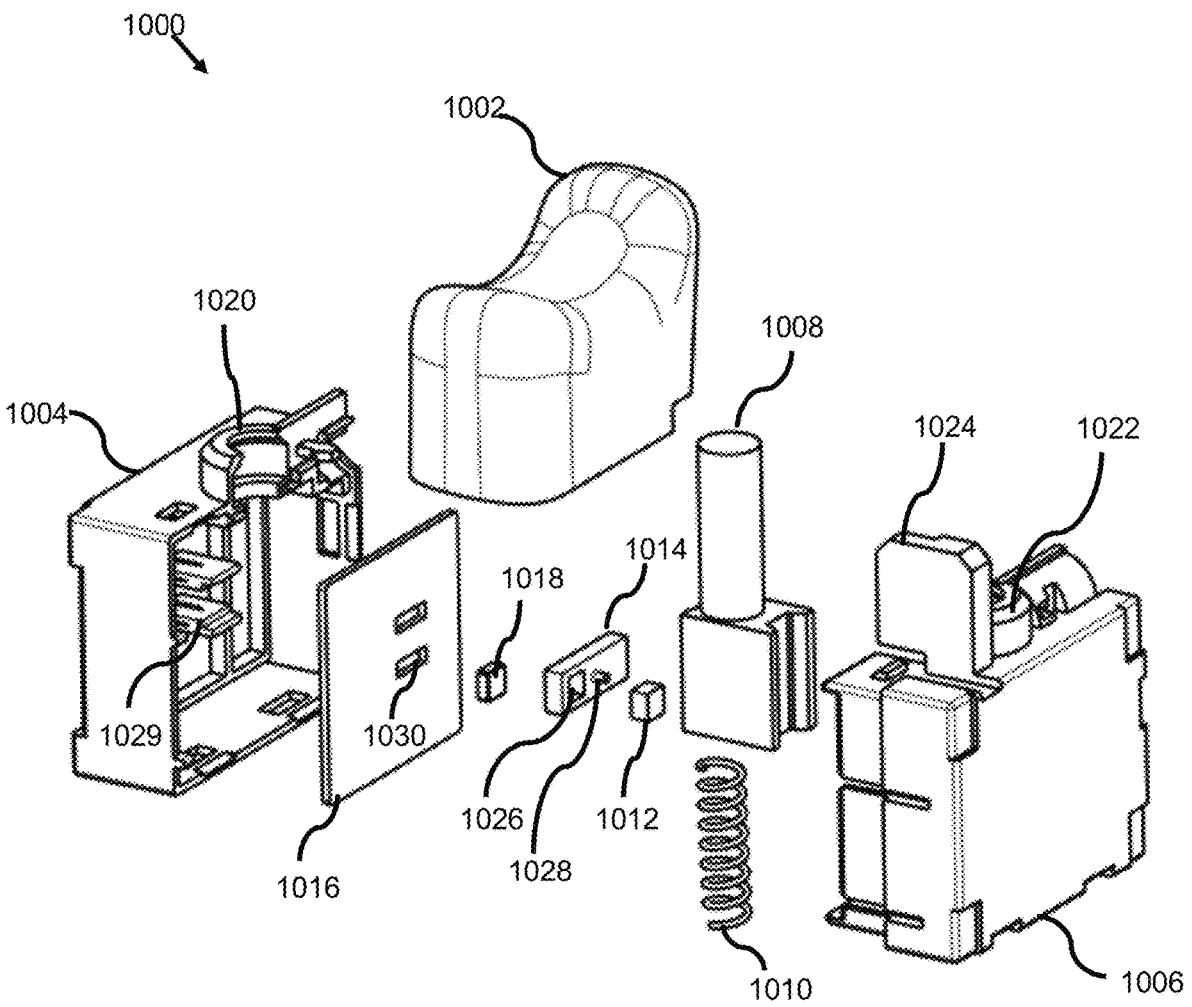
FIG. 10A illustrates an oblique, right-handed, exploded view of another example linear contactless electronic switch module using a magnet member and Hall sensor in accordance with aspects of the present disclosure.

FIG. 10A illustrates an oblique, right-handed, exploded view of another example linear contactless electronic switch module 1000 using a magnet member 1012 and Hall sensor 1018 in accordance with aspects of the present disclosure.

As illustrated in FIG. 10A, linear contactless electronic switch module 1000 includes a trigger 1002, a housing body part 1004, a housing body part 1006, a plunger member 1008, a restoring force spring 1010, magnet member 1012, a magnet member holder 1014, a printed circuit board (PCB) 1016, and a Hall sensor 1018. Housing body part 1004 includes retaining rails 1029. Housing body part 1004 additionally includes a cut out 1020, whereas housing body part 1006 includes a cut out 1022. Further, housing body part 1006 includes a trigger stop 1024. Magnet holder 1014 includes a magnet member retaining space 1026 and a slip 1028. PCB 1016 includes retaining rails 1030.

Figure 10B:
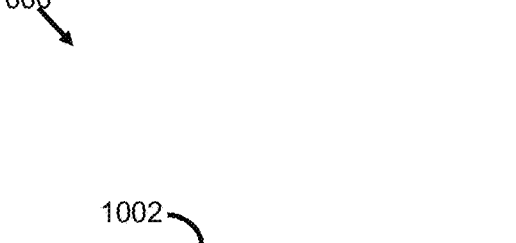
FIG. 10B illustrates an oblique, left-handed, exploded view of the example linear contactless electronic switch module of FIG. 10A.
Figure 10B:
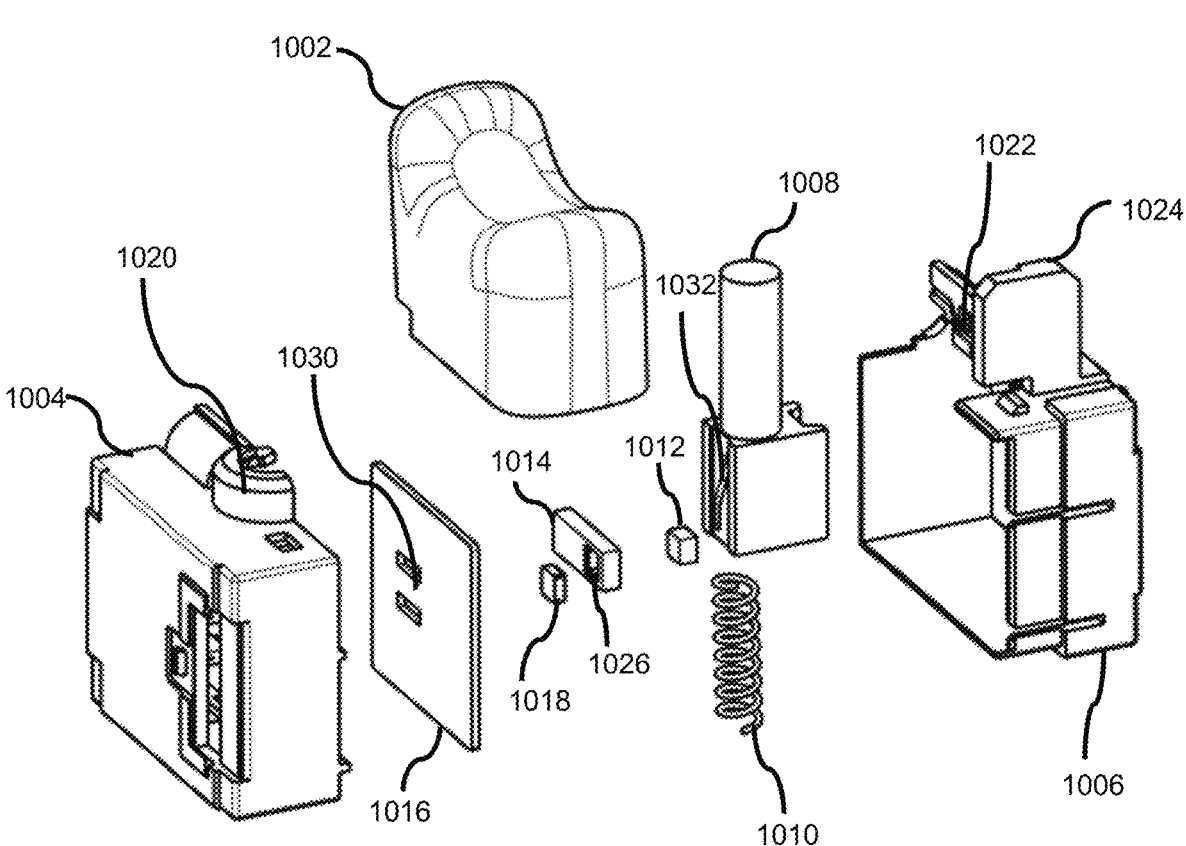

FIG. 10B illustrates an oblique, left-handed, exploded view of the example linear contactless electronic switch module of FIG. 10A. As illustrated in FIG. 10B, plunger member 1008 includes a non-linear groove 1032.

Figure 11A:
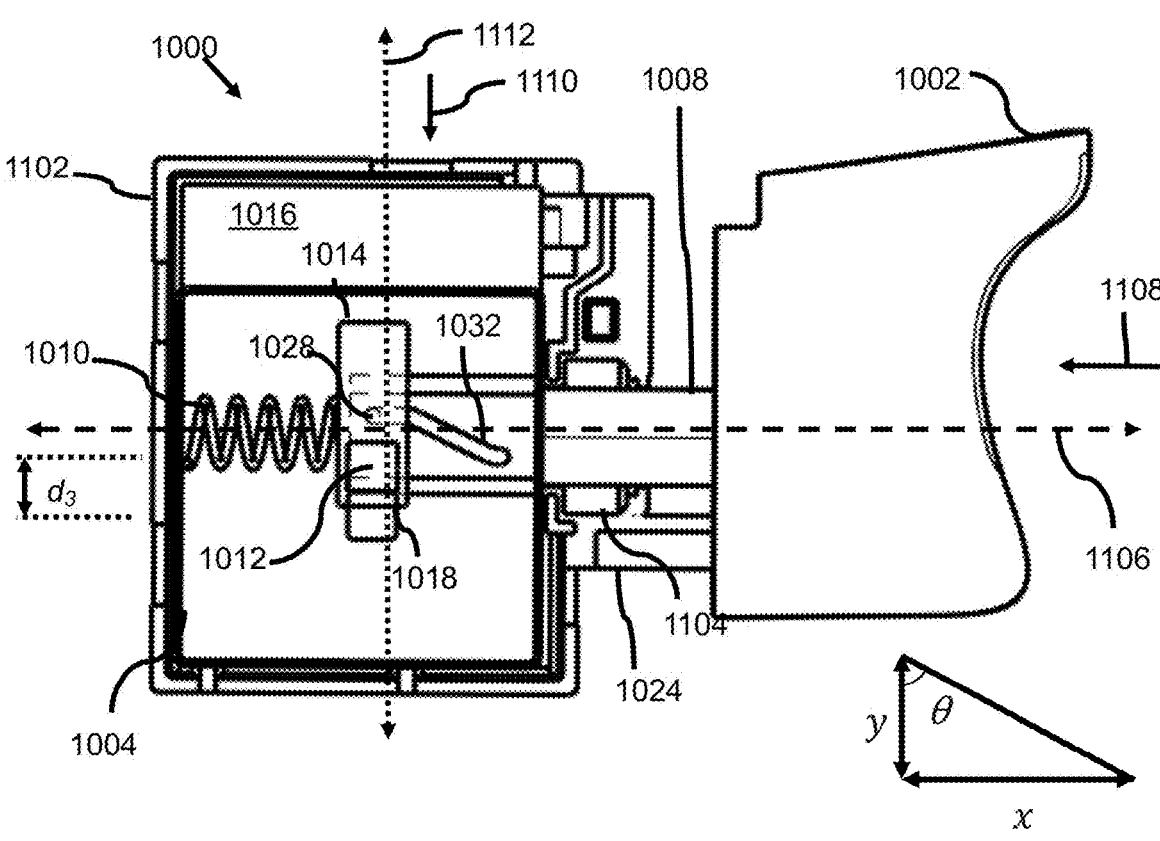
FIG. 11A illustrates a transparent plan view of the example linear contactless electronic switch module of FIG. 10A at an initial state.

FIG. 11A illustrates a transparent plan view of the example linear contactless electronic switch module 1000 at an initial state.

Figure 11B:
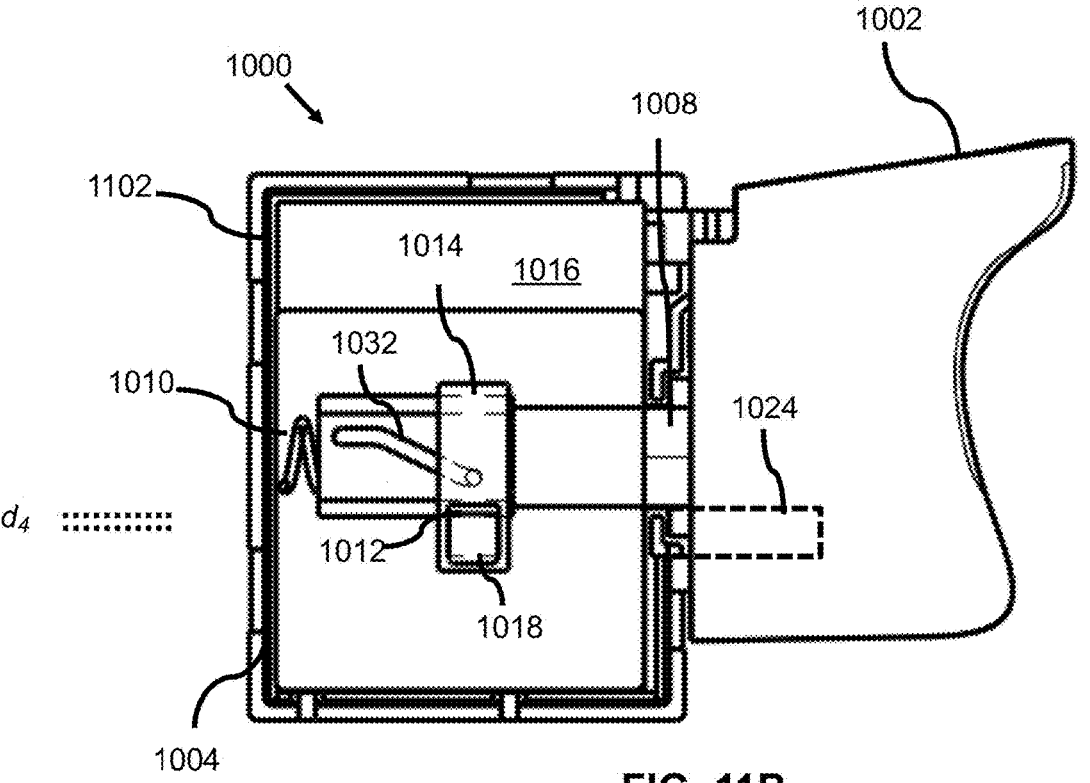
FIG. 11B illustrates a transparent plan view of the example linear contactless electronic switch module of FIG. 10A at a fully depressed state.

FIG. 11B illustrates a transparent plan view of the example linear contactless electronic switch module 1000 at a fully depressed state.

As illustrated in these figures, trigger 1002 is connected to plunger member 1008. Housing body part 1004 and housing body part 1006 are connected to form a housing 1102. Further, when connected together to form housing 1102, cut out 1020 of housing body part 1004 and cut out 1022 of housing body part 1006 form a chute 1104 for which plunger member 1008 may move along an axis 1106.

Plunger 1008 is additionally connected to magnet member holder 1014. Restoring force spring 1010 is disposed between the bottom of plunger member 1008 and housing 1102. Magnet 1012 is disposed magnet member retaining space 1026 (illustrated in FIGS. 10A and 10B) of magnet member holder 1014. Hall sensor 1018 is disposed on PCB 1016. Slip 1028 (Illustrated in FIG. 10A) on magnet member holder 1014 is disposed within non-linear groove 1032.

In operation, when trigger 1002 is pressed in a direction 1108, plunger member 1008 moves in direction 1108 along axis 1106 through chute 1104. Slip 1028 moves along non-linear groove 1032 so as to move magnet member holder 1014 in a direction 1110 along an axis 1112.

As illustrated in FIGS. 10A and 10B, retaining rails 1029 on housing body part 1029 are configured to pass through holes 1030 on PCB 1016 to restrict magnet member holder 1014 to movement in a direction perpendicular to the movement of plunger member 1008. Returning to FIG. 11A, as plunger member 1008 moves along axis 1106, magnet member 1012 within magnet member holder 1014 moves only along axis 1112 because of the constraint of retaining rails 1029.

In short, the relationship between the displacement of plunger member 1008 along axis 906 (x) and the displacement of magnet member 1012 along axis 912 (y) is, y=x/tan θ. As a result, as long as θ>45°, then y<x. This realizes the desired travel transition, wherein magnet member 1012 travels less distance than plunger member 1008. This will be described in greater detail with reference to FIG. 12.

Figure 12:
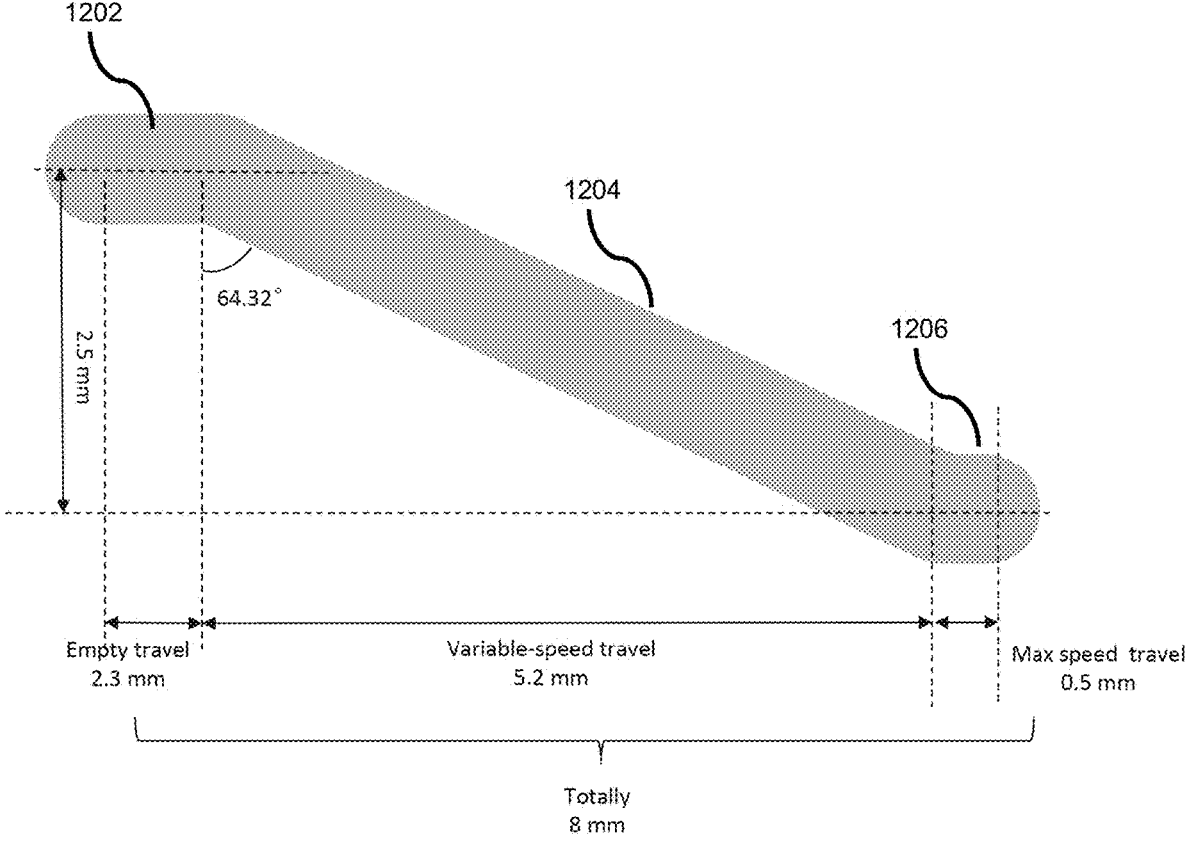
FIG. 12 illustrates the variable speed travel of the magnet member of the example linear contactless electronic switch module of FIG. 10A.

FIG. 12 illustrates the variable speed travel of magnet member 1012 as compared to that of plunger member 1008 of the example linear contactless electronic switch module of FIG. 10A. As illustrated in FIG. 12, the total travel of magnet member 1012 is 2.5 mm along axis 1112. On the other hand, plunger member 1008 first moves 2.3 mm along axis 1106 of empty travel—meaning, magnet member 1012 does not move at all during this period—as illustrated in section 1202. Then plunger member 1008 moves 5.2 mm along axis 1106 as illustrated by section 1204. During this period of movement magnet member 1012 additionally moves along axis 1112. As θ is 64.32°, plunger member 1008 moves 5.2 mm along axis 1106, whereas magnet member 1012 moves 2.5 mm along axis 1112. Finally, plunger member 1008 moves an additional 0.5 mm along axis 1106, whereas magnet member 1012 does not mot at all, as illustrated by section 1206.

As illustrated in FIG. 11B, plunger member 1008 finishes the 8 mm full travel. FIG. 11B illustrates a transparent plan view of the example linear contactless electronic switch module of FIG. 10A at a fully depressed state. Trigger stop 1024 engages trigger 1002 to limit the distance traveled in direction 1108 so as to prevent over-compression and damage to restoring force spring 1010.

In the above discussed example embodiments, a contactless electronic switch module with position detection capability uses a displacement mechanism to reduce the amount of travel of a magnet member for detection by a Hall sensor. In some non-limiting examples, a magnet member might even only move 2.5 mm while the plunger member in the electronic switch module moves 8 mm. While a Hall sensor may be used to detect a range of motion of 2.5 mm, the detection may be improved. In particular, in accordance with another aspect of the present disclosure, two magnet members are used for detection by a Hall electronic switch module, wherein the two magnet members are mounted so as to be oppositely polarized. This will be described in greater detail with reference to FIGS. 13-14.

Figure 13:
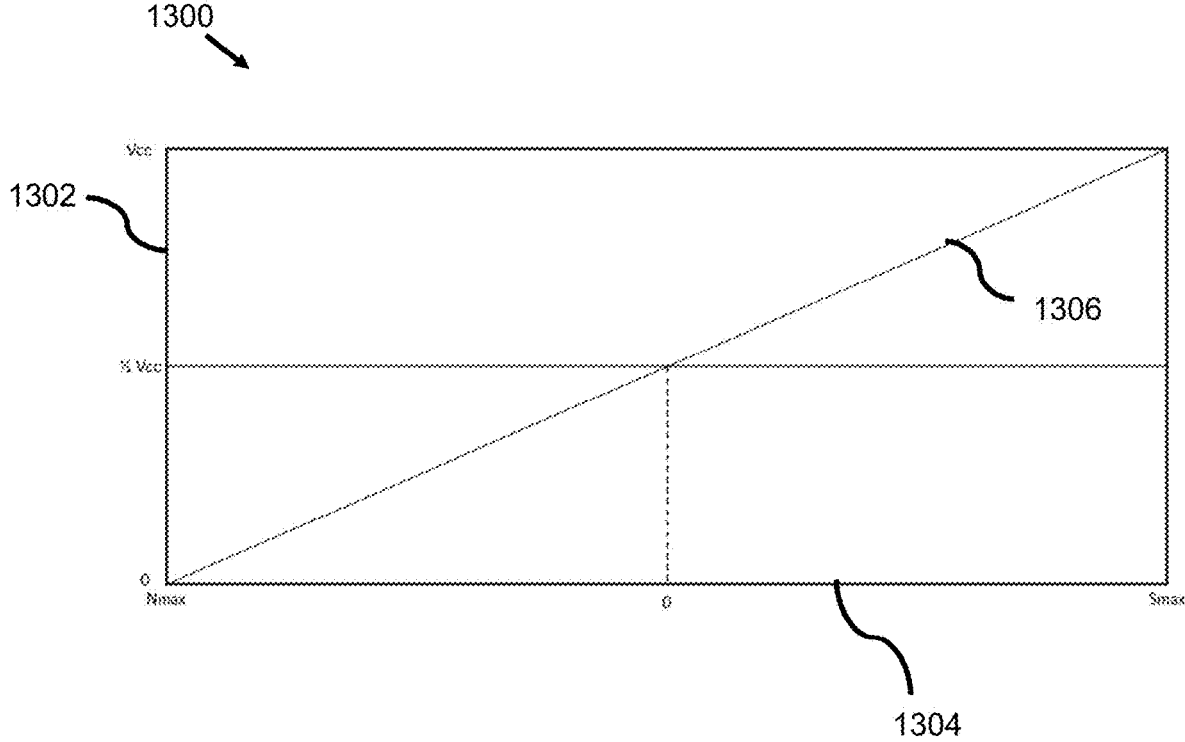
FIG. 13 illustrates a graph of transfer characteristics of a Hall sensor.

FIG. 13 illustrates a graph 1300 of transfer characteristics of a Hall sensor. As illustrated in the figure, graph 1300 includes a y-axis 1302, an x-axis 1304, and a function 1306. Y-axis 1302 represents the output voltage, $V_{out}$, a Hall sensor and is in units of volts from 0 volts to a maximum $V_{cc}$ volts. In an example embodiment, $V_{cc}$ is 5 V. X-axis 1304 represents a magnetic induction intensity of two magnet members and the Hall sensor, and is in units of Gauss. The left-hand side of X-axis 1304 represents the maximum northern pole detection, whereas the right-hand side represents the maximum southern pole detection, and whereas the center, 0, represents an equal amount of southern pole detection and northern pole detection. Graph 1300 represents the maximum magnetic induction of two different polls of a magnet that the Hall sensor can sense.

In this case, the Hall sensor is a linear Hall sensor, wherein the output voltage as a function of detected magnetic field is a linear function. Further, the Hall sensor can sense both north polarization magnetic fields and south polarization magnetic fields. In this example embodiment, a Hall sensor has three outputs of particular note: 1) at 0.0 V, wherein a maximum north polarization is detected; 2) at ½ $V_{cc}$, wherein an equal amount of north and south polarization is detected, i.e., no overall polarization; and 3) at $V_{cc}$, wherein a maximum south polarization is detected.

Returning to FIG. 7, in an embodiment, the single magnet member 710 may be replaced with two magnet members spaced along axis 714, wherein both centers of the two magnet member are collinear. In such a case, the vertical distance, dv, from Hall sensor 708 to each of the two magnet members is equal. Therefore, only the linear distance, $d_l$, need be considered, while the two magnet members move along axis 714.

This function and layout of a two-magnet member Hall sensor in accordance with aspects of the present disclosure will now be described in greater detail with reference to FIGS. 14A through 14C.

Figure 14A:
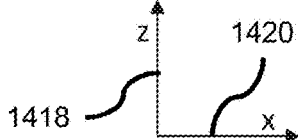
FIG. 14A illustrates a spatial relationship in an x-z plane between two magnet members and a Hall sensor at a first position in accordance with aspect of the present disclosure.
Figure 14A:
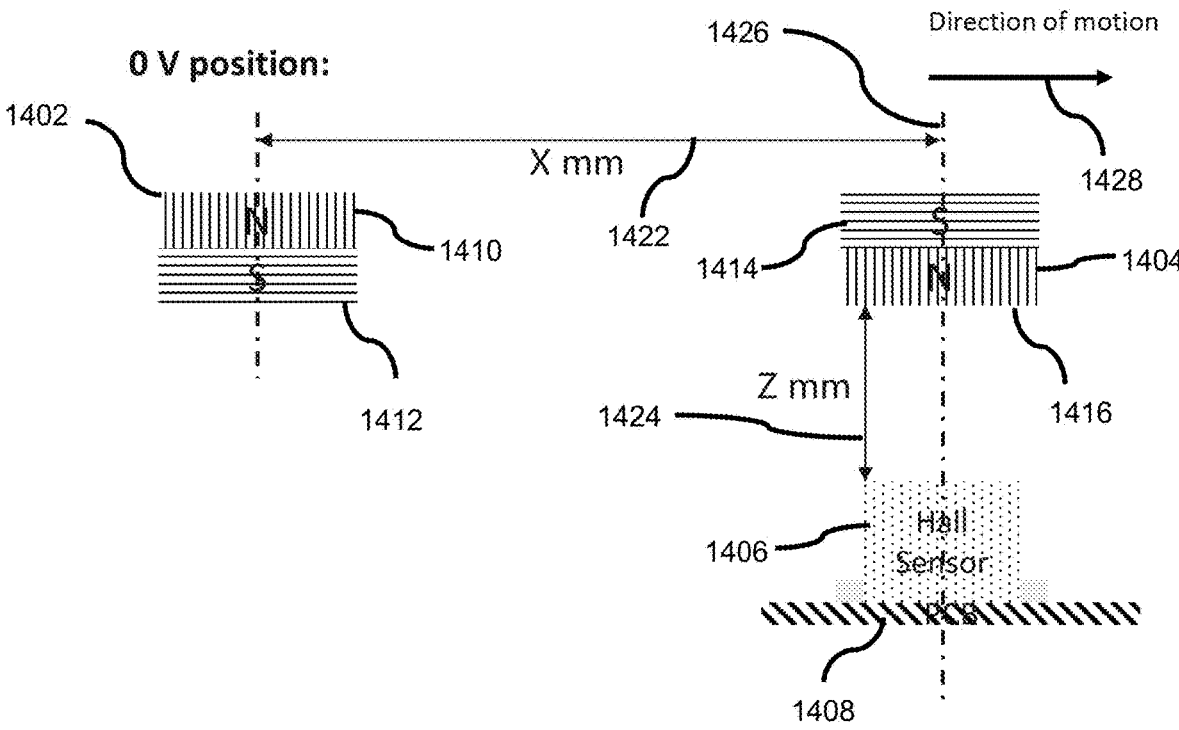

FIG. 14A illustrates a spatial relationship in an x-z plane between two magnet members, 1402 and 1404, and a Hall sensor 1406 at a first position in accordance with aspect of the present disclosure. As illustrated in the figure, Hall sensor 1406 is disposed on a PCB 1408. Magnet 1402 is operable such that a north pole 1410 is above a south pole 1412, whereas magnet member 1404 is operable such that a south pole 1414 is above a north pole 1416. A key shows a z-axis 1418 and an x-axis 1420 for the figure.

Magnet member 1402 is disposed X mm from magnet member 1404 along x-axis 1420 as illustrated by arrow 1422. Magnet member 1404 is disposed Z mm from Hall sensor 1406 along z-axis 1418 as indicated by arrow 1424. In this position, magnet member 1404 is directly across from Hall sensor along z-axis 1418 as indicated by the dashed-dotted line 1426. Further, the combination of magnet members is movable in a direction indicated by arrow 1428.

In the position of FIG. 14A, Hall sensor will sense the magnetic field from north pole 1416 of magnet member 1404. This corresponds to x-left-most point on axis 1304 of FIG. 13, wherein Hall sensor 1406 provides a 0 V output.

As mentioned above with respect to FIGS. 5-10, as a plunger member for an electronic switch module is depressed, in accordance with aspects of the present disclosure, the magnet member will be moved about the Hall sensor, yet in much less magnitude. In this example of FIG. 14A, the direction of movement is indicated by arrow 1428. As magnet member 1402 and magnet member 1404 moves along direction 1428, the voltage output from Hall sensor 1406 will correspond to function 1306 of FIG. 13. Eventually, Hall sensor 1406 will detect no magnetic field because there is an equal amount of north polarized magnetic field incident from magnet member 1404 and south polarized magnetic field incident from magnet member 1402. This will be described in greater detail with reference to FIG. 14B.

Figure 14B:
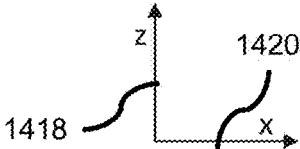
FIG. 14B illustrates a spatial relationship in an x-z plane between two magnet members and a Hall sensor at a second position in accordance with aspect of the present disclosure.
Figure 14B:
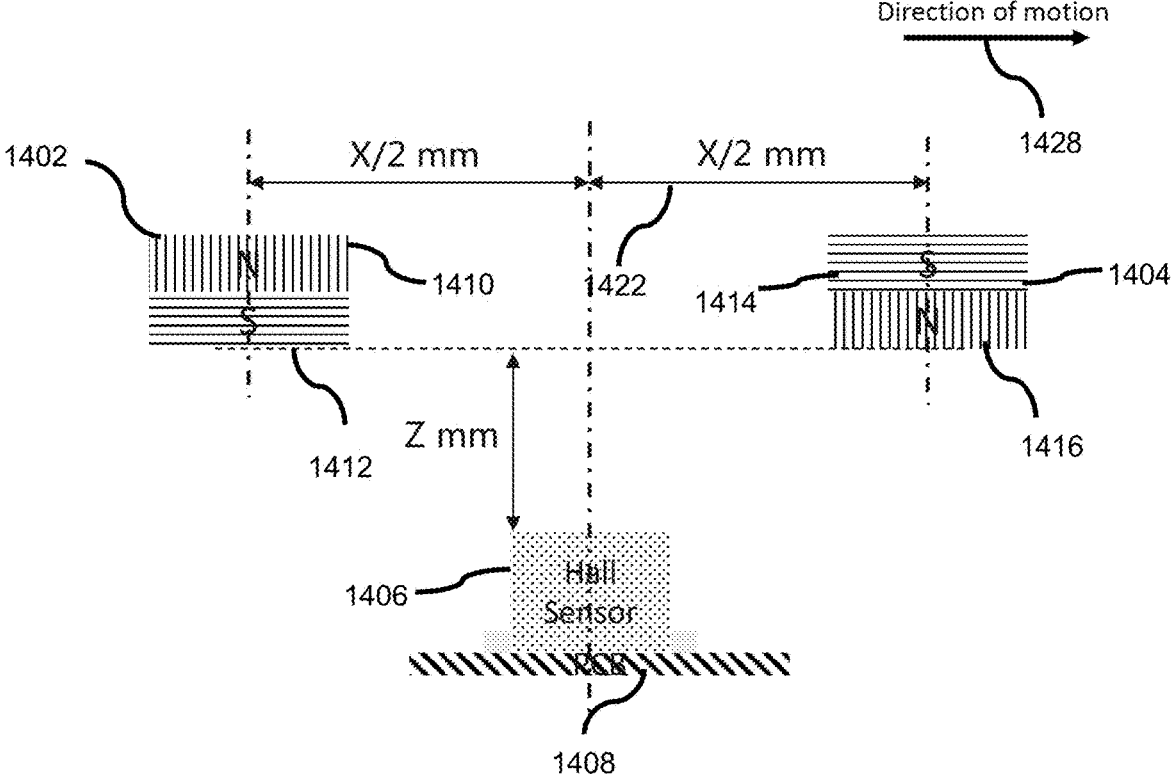

FIG. 14B illustrates a spatial relationship in an x-z plane between two magnet members and a Hall sensor at a second position in accordance with aspect of the present disclosure.

In the position of FIG. 14B, Hall sensor 1406 is equidistant from magnet member 1402 and magnet member 1404. As such, Hall sensor 1406 will sense the magnetic field from north pole 1416 of magnet member 1404 and the magnetic field from south pole 1412 of magnet member 1402 in equal amounts. Accordingly, the total detected magnetic field in Gauss will be approximately zero. This corresponds to the zero point on axis 1304 of FIG. 13, wherein Hall sensor 1406 provides a ½ $V_{cc}$ output.

Again, as mentioned above with respect to FIGS. 5-10, as a plunger member for an electronic switch module is depressed, in accordance with aspects of the present disclosure, the magnet member will continue to be moved in the direction as indicated by arrow 1428 in FIG. 14B. Eventually, the plunger member will reach its maximum depression, wherein Hall sensor 1406 will detect south polarized magnetic field incident from magnet member 1402. This will be described in greater detail with reference to FIG. 14C.

Figure 14C:
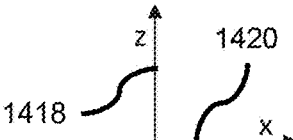
FIG. 14C illustrates a spatial relationship in an x-z plane between two magnet members and a Hall sensor at a third position in accordance with aspect of the present disclosure.
Figure 14C:
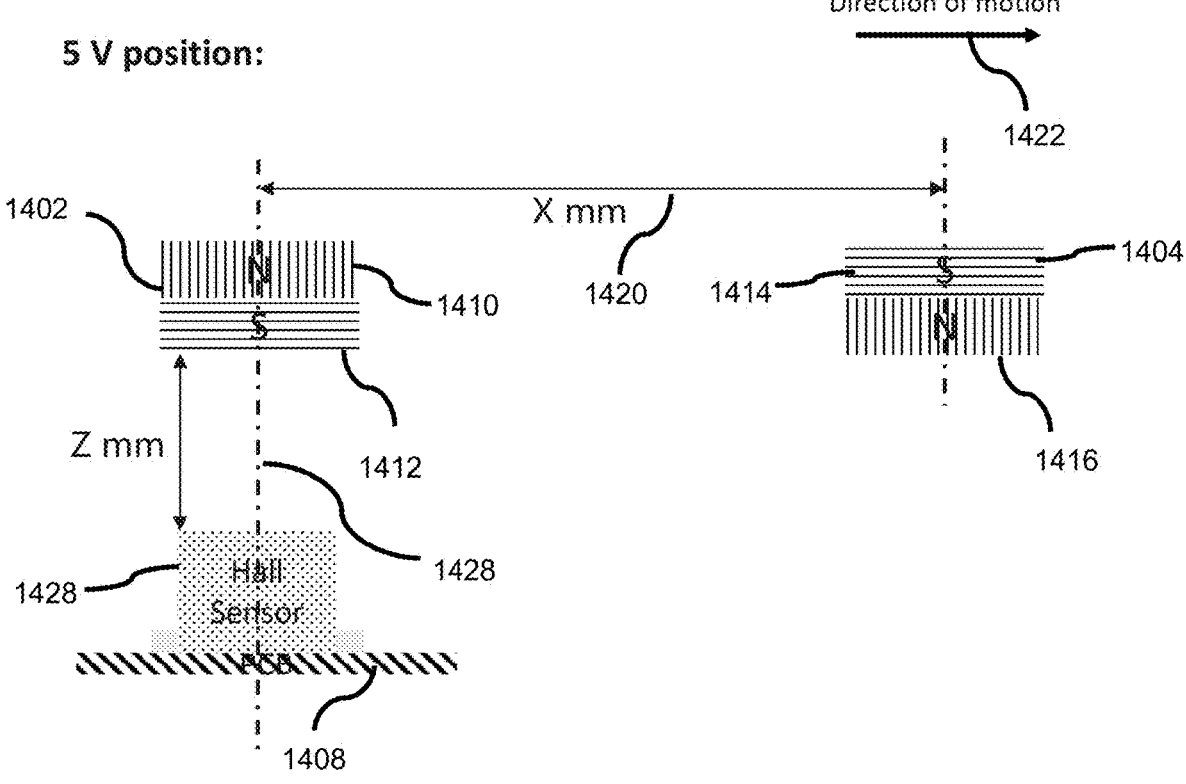

FIG. 14C illustrates a spatial relationship in an x-z plane between two magnet members and a Hall sensor at a third position in accordance with aspect of the present disclosure.

In the position of FIG. 14C, Hall sensor 1406 will sense the magnetic field from south pole 1412 of magnet member 1402. This corresponds to the left-most point on X-axis 1304 of FIG. 13, wherein Hall sensor 1406 provides a $V_{cc}$ output.

A non-limiting carriage system to move a dual magnet member system as discussed above with reference to FIGS. 13-14C will now be described in greater detail with reference to FIGS. 15-16.

Figure 15:
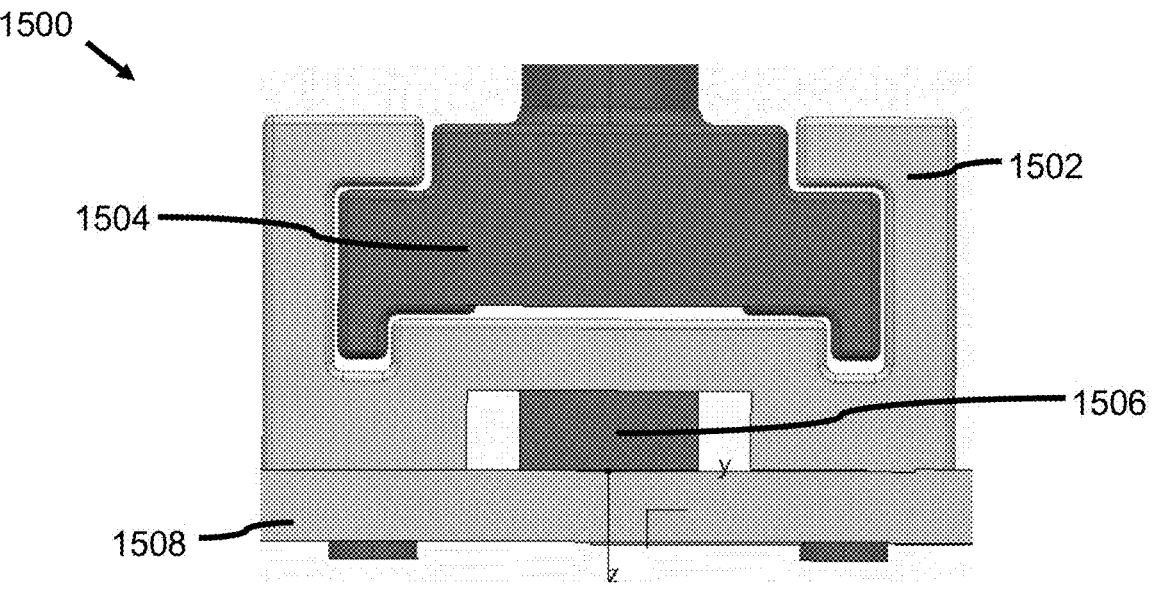
FIG. 15 illustrates a cross-sectional side view of an example support system to support two magnet members in accordance with aspects of the present disclosure.

FIG. 15 illustrates a cross-sectional side view of an example support system 1500 to support two magnet members in accordance with aspects of the present disclosure.

As illustrated in the figure, support system 1500 includes a support structure or member 1502, a slip 1504, a Hall sensor 1506, and a PCB 1508. Slip 1504 is operable to fit in support member 1502. Further, support member 1502 is operable to separate slip 1504 from Hall sensor 1506. Support member 1502 and Hall sensor 1506 are disposed on PCB 1508.

Figure 16:
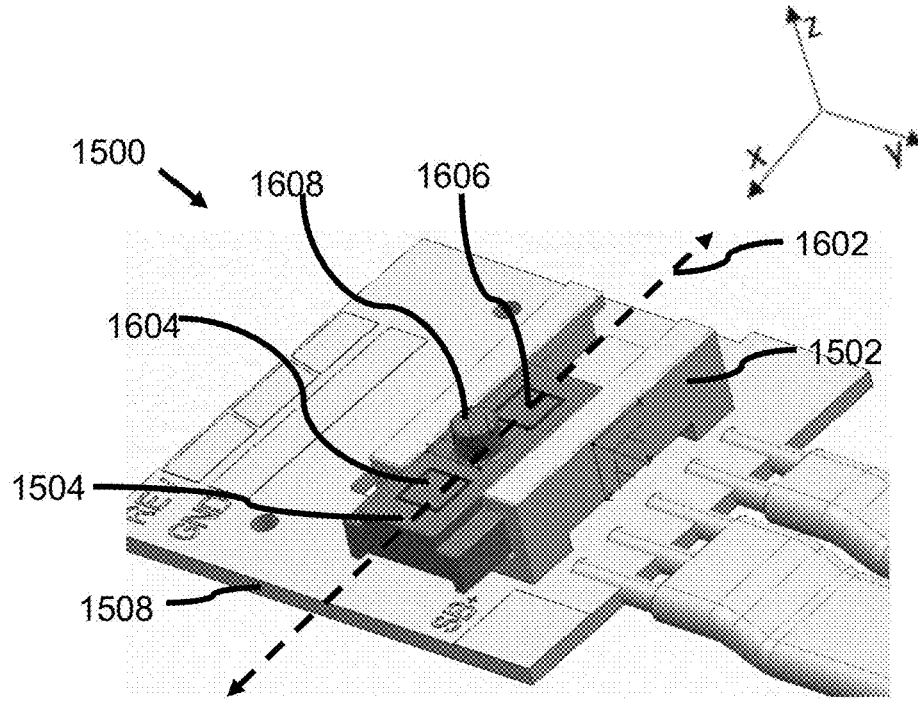
FIG. 16 illustrates an oblique view of the example support system of FIG. 15.

FIG. 16 illustrates an oblique view of support system 1500 of FIG. 15. As illustrated in FIG. 16, slip 1504 is disposed within support member 1502 so as to be able to slide back and forth along an axis 1602. Further, slip 1504 retains a magnet member 1604 and a magnet member 1606 in a manner as discussed above with reference to FIGS. 14A through 14C. Further, in this non-limiting example embodiment, slip 1504 includes a slip 1606 that may be used in a corresponding groove in a manner similar to that discussed above with reference to FIGS. 10A through 10. It should be noted however, that a combination of two magnet members may additionally be incorporated into embodiments discussed above with reference to FIGS. 10A through 7B, in accordance with aspects of the present disclosure.

Conventional switches that have position sensing capability use a swiping contact with a potentiometer. The contact between the swiper and the potentiometer wear over time and decrease the overall lifetime of the switch.

In accordance with aspects of the present disclosure, an electronic switch module having position sensing capability is contactless, thus increasing the overall life of the electronic switch module over that of conventional switches. In particular, a magnet member is used in conjunction with a Hall sensor to detect the position of the plunger member of the switch. A displacement mechanism is used to decrease the overall distance moved by the magnet member as compared to the overall distance moved by the plunger member. In some embodiments the magnet member moves along an axis that is parallel with that of the movement of the plunger member. In some of these embodiments the parallel motion is provided via a rack and pinion system. In other embodiments, the magnet member moves along an axis that is perpendicular with that of the movement of the plunger member. In some of these embodiments, the perpendicular motion is provided via a slip and groove system. Still further, the "magnet member" may be replaced by a pair of magnet members that are disposed from one another by a distance along an axis of travel. The magnet members are also disposed so as to provide oppositely polarized magnetic flux to the Hall sensor. This arrangement of two magnet members increases the accuracy of detection by the Hall sensor.

The terms "coupled," "attached," or "connected" may be used herein to refer to any type of relationship, direct or indirect, between the components in question, and may apply to electrical, mechanical, fluid, optical, electromagnetic, electromechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the exemplary embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

The invention claimed is:

1. A switch, comprising:
a housing having a chute;
a plunger moveably mounted within the chute and moveable along a first axis with a first velocity;
a magnet disposed within the housing;
a Hall sensor disposed within the housing; and
a displacement mechanism disposed within the housing and operable to displace the magnet along a second axis with a second velocity, wherein the first velocity is greater than the second velocity, and
wherein the Hall sensor is operable to output a signal associated with a first location of the plunger member along the first axis based on a second location of the magnet member along the second axis.

2. The switch of claim 1, wherein the first axis is parallel with the second axis and the Hall sensor is located at an offset distance from the second axis.

3. The switch of claim 2, wherein:
the displacement mechanism comprises a rack and a pinion,
the rack is disposed on the plunger and is engaged with the pinion, and
the pinion is operable to rotate at an angular velocity in response to movement by the plunger along the first axis at the first velocity.

4. The switch of claim 3, wherein:
the displacement mechanism further comprises a second rack and a second pinion,
the pinion has a first radius,
the second pinion has a second radius that is less than the first radius and is operable to rotate with the pinion at the angular velocity,
the second rack is engaged with the second pinion to move along the second axis with rotation of the second pinion, and
the magnet is disposed on the second rack.

5. The switch of claim 2, further comprising a second magnet disposed within the housing.

6. The switch of claim 5, wherein:
the displacement mechanism is additionally operable to displace the second magnet along the second axis at the second velocity by a second distance away from the Hall sensor, and
the Hall sensor is operable to output the signal associated with the first location of the plunger along the first axis based on both the second location of the magnet along the second axis and a third location of the second magnet along the second axis.

7. The switch of claim 1, wherein the first axis is perpendicular with the second axis.

8. The switch of claim 7, wherein:
the plunger includes a groove, and
the displacement mechanism comprises a slip operable to slide along the groove so as to displace the magnet along the second axis at the second velocity by the distance away from the Hall sensor.

9. The switch of claim 8, wherein:
the displacement mechanism further comprises a support member operable to support the magnet,
the slip is connected to the support, and
the support is operable to facilitate movement of the slip along the second axis based on the slip sliding along the groove.

10. The switch of claim 9, further comprising a second magnet supported by the support member.

11. The switch of claim 10, wherein:

the displacement mechanism is additionally operable to displace the second magnet along the second axis at the second velocity by a second distance away from the Hall sensor, and the Hall sensor is operable to output the signal associated with the first location of the plunger along the first axis based on both the second location of the magnet along the second axis and a third location of the second magnet along the second axis.

12. The switch of claim 1, further comprising a second magnet disposed within the housing.

13. The switch of claim 12, wherein:

the displacement mechanism is additionally operable to displace the second magnet along the second axis at the second velocity by a second distance away from the Hall sensor, and the Hall sensor is operable to output the signal associated with the first location of the plunger along the first axis based on both the second location of the magnet along the second axis and a third location of the second magnet along the second axis.

14. A power tool, comprising:

a main body having a handle portion;

an output supported by the main body;

a motor, supported by the main body, and operable to rotatably drive the output; and a switch supported by the handle portion, the switch including:

a housing having a chute;

a plunger moveably mounted within the chute and moveable along a first axis at a first velocity;

a magnet disposed within the housing;

a Hall sensor disposed within the housing; and a displacement mechanism disposed within the housing and operable to displace the magnet along a second axis at a second velocity by a distance away from the Hall sensor, wherein the first velocity is greater than the second velocity, wherein the Hall sensor is operable to output a signal associated with a first location of the plunger along the first axis based on a second location of the magnet along the second axis.

15. The power tool of claim 14, wherein the first axis is parallel with the second axis and the Hall sensor is located at an offset distance from the second axis.

16. The power tool of claim 15, wherein:

the displacement mechanism comprises a rack and a pinion, the rack is disposed on the plunger and is engaged with the pinion, and the pinion is operable to rotate at an angular velocity in response to movement by the plunger along the first axis at the first velocity.

17. The power tool of claim 16, wherein:

the displacement mechanism further comprises a second rack and a second pinion, the pinion has a first radius, the second pinion has a second radius that is less than the first radius and is operable to rotate with the pinion at the angular velocity, the second rack is engaged with the second pinion to move along the second axis with rotation of the second pinion, and the magnet is disposed on the second rack.

18. The power tool of claim 15, further comprising a second magnet disposed within the housing.

19. The power tool of claim 18, wherein:

the displacement mechanism is additionally operable to displace the second magnet along the second axis at the second velocity by a second distance away from the Hall sensor, and the Hall sensor is operable to output the signal associated with the first location of the plunger along the first axis based on both the second location of the magnet along the second axis and a third location of the second magnet along the second axis.

20. The power tool of claim 14, wherein the first axis is perpendicular with the second axis.

* * * * *